United States Patent
Kitada

(10) Patent No.: US 9,148,378 B2
(45) Date of Patent: Sep. 29, 2015

(54) PACKET PROCESSING APPARATUS AND PACKET PROCESSING METHOD

(71) Applicant: FUJITSU LIMITED, Kawasaki-shi, Kanagawa (JP)

(72) Inventor: Atsushi Kitada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 152 days.

(21) Appl. No.: 13/887,985

(22) Filed: May 6, 2013

(65) Prior Publication Data

US 2014/0016463 A1    Jan. 16, 2014

(30) Foreign Application Priority Data

Jul. 10, 2012   (JP) ................ 201 2-1 54230

(51) Int. Cl.
*H04L 12/801*   (2013.01)
*H04L 12/813*   (2013.01)
*H04L 12/911*   (2013.01)

(52) U.S. Cl.
CPC ...................................... *H04L 47/20* (2013.01)

(58) Field of Classification Search
CPC ............ H04L 12/5693; H04L 47/6215; H04L 2012/5651; H04L 2012/5679; H04L 2012/568; H04L 47/10; H04L 47/20; H04L 47/22; H04L 47/2433; H04L 47/2441; H04L 47/54; H04L 47/56; H04L 49/90; H04L 49/9036
USPC .............. 370/229, 230, 230.1, 235, 254, 351, 370/389, 392, 412, 428, 429
See application file for complete search history.

(56) References Cited

U.S. PATENT DOCUMENTS

| | | | | |
|---|---|---|---|---|
| 5,982,296 A | * | 11/1999 | Wakasa et al. ................ | 370/392 |
| 6,430,192 B1 | * | 8/2002 | Creedon et al. ............... | 370/428 |
| 7,535,835 B2 | * | 5/2009 | Davies et al. ................. | 370/230 |
| 2003/0219014 A1 | | 11/2003 | Kotabe et al. | |
| 2004/0151197 A1 | * | 8/2004 | Hui ................................ | 370/412 |
| 2008/0120081 A1 | * | 5/2008 | Chandrashekar et al. ...... | 703/13 |
| 2012/0230302 A1 | * | 9/2012 | Calcev et al. ................. | 370/336 |
| 2013/0028082 A1 | * | 1/2013 | Hata et al. .................... | 370/230 |

FOREIGN PATENT DOCUMENTS

JP   2003-338837   11/2003

* cited by examiner

*Primary Examiner* — Ahmed Elallam
(74) *Attorney, Agent, or Firm* — Fujitsu Patent Center

(57) ABSTRACT

A packet processing apparatus includes a packet processing unit that performs a packet output process, an extraction unit that extracts information about each packet before the packet is inputted to the packet processing unit, and a contention handling unit that performs a process avoiding occurrence of contention between/among predetermined processes before the packet is inputted in the packet processing unit, the contention being predicted based on the information about the packet. As a process avoiding contention among series of processes including, for example, processes performed by the packet processing unit to read an amount of transmission rights from a storage unit, do subtraction, and write the amount of transmission rights back into the storage unit, the contention handling unit detects packets belonging to a same flow from information about predetermined number of successive packets and reports the information to the packet processing unit on a flow by flow basis.

8 Claims, 24 Drawing Sheets

FIG. 8

| OFFSET | FLOW ID | PACKET LENGTH | COMPUTATION RESULT | COLOR DETERMINATION |
|---|---|---|---|---|
| 0 | 3 | 64B | COMPLETED | GREEN |
| 1 | 1 | 100B | COMPLETED | GREEN |
| 2 | 2 | 128B | - | - |
| 3 | 1 | 96B | COMPLETED | YELLOW |
| 4 | N | 1500B | - | - |

FIG. 17

| FLOW ID | CHANGE FLAG | CHANGED FLOW ID |
|---|---|---|
| 0 | - | 0 |
| 1 | - | 1 |
| 2 | SET | 7 |
| 3 | - | 3 |
| 4 | - | 4 |
| 5 | - | 5 |
| 6 | - | 6 |
| 7 | SET | 2 |
| 8 | - | 8 |
| ... | ... | ... |

REFER BY INCREMENTING →

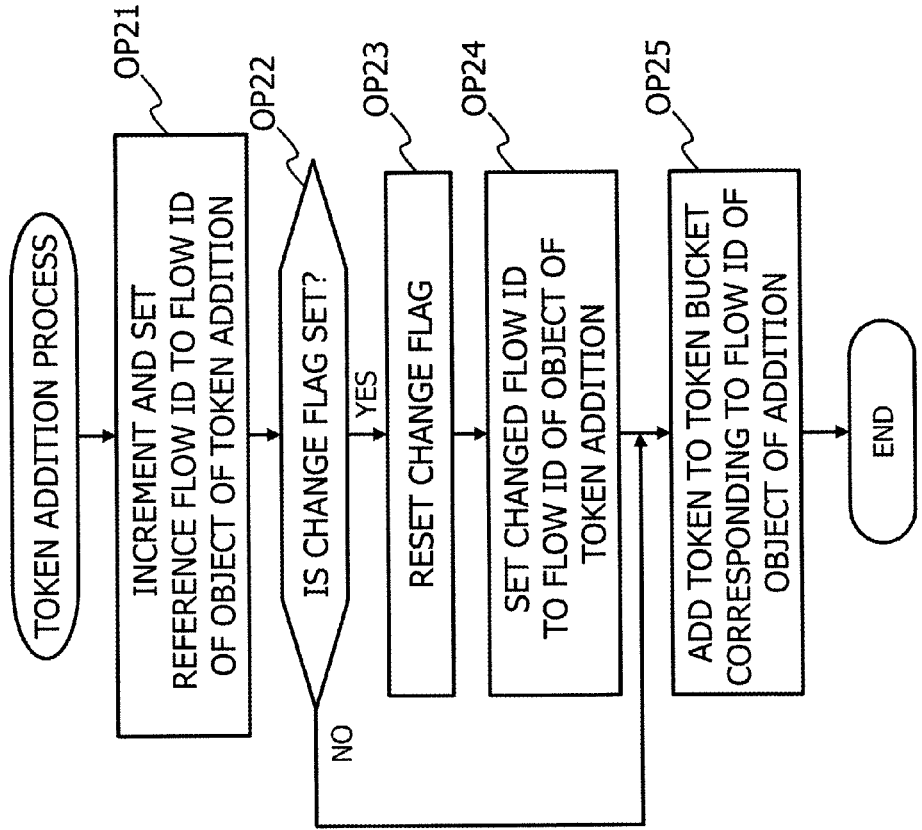

PACKET PROCESSING APPARATUS AND PACKET PROCESSING METHOD

CROSS-REFERENCE TO RELATED APPLICATION

This application is based upon and claims the benefit of priority of the prior Japanese Patent Application No. 2012-154230, filed on Jul. 10, 2012, the entire contents of which are incorporated herein by reference.

FIELD

The present invention relates to a packet processing apparatus implementing QoS (Quality of Service).

BACKGROUND

FIG. 1 is a diagram illustrating an exemplary logical configuration of a packet processing apparatus. The packet processing apparatus such as a router or layer 2 switch executes QoS according to a contract bandwidth of a user. The QoS includes, for example, priority control intended to preferentially output voice or other high-priority packets and bandwidth control intended to restrict an output rate to a contract bandwidth.

The bandwidth control includes, for example, input control intended for input packets and output control intended for output packets. Examples of input control include policing. The policing is a method for controlling the output rate of the packet processing apparatus, for example, by discarding packets entering at a rate in excess of CIR (Committed Information Rate), which is a guaranteed bandwidth. The policing is done, for example, by a policer provided on an input-side interface card P11 of the packet processing apparatus illustrated in FIG. 1. Examples of output control include scheduling and shaping. The scheduling is a technique for controlling output timing of packets. Such techniques include, for example, a method that preferentially outputs packets queued on a priority basis, in descending order of priority (priority queuing). The shaping is a method for controlling the output rate by queuing the packets that exceed the CIR. The shaping and scheduling are done, for example, by a shaper and scheduler provided on an output-side interface card P12 of the packet processing apparatus illustrated in FIG. 1. Recently, processing for bandwidth control has become complicated along with increases in volumes of traffic and processing performed on interface cards has become complicated accordingly.

PATENT DOCUMENT

[Patent document 1] Japanese Laid-open Patent Publication No. 2003-338837

However, while processing expected of interface cards becomes complicated, increases in processing speed, which are contradictory to the complicated processing, are expected of the interface cards at the same time, posing a problem of limitations on QoS processing performance of the packet processing apparatus.

SUMMARY

According to one aspect of the present invention, a packet processing apparatus includes: a packet processing unit that performs a packet output process; an extraction unit that extracts information about each packet before the packet is inputted to the packet processing unit; and a contention handling unit that performs a process avoiding occurrence of contention between/among predetermined processes before the packet is inputted in the packet processing unit, the contention being predicted based on the information about the packet.

Another aspect of the present invention is a packet processing method performed by the packet processing apparatus described above. Still other aspects of the present invention includes a packet processing program causing a computer to function as the packet processing apparatus described above, and a computer-readable recording medium adapted to record the program thereon. The recording medium readable by a computer and the like is a recording medium that accumulates information of data, programs, and the like by electrical, magnetic, optical, mechanical, or chemical action and that can be read from the computer and the like.

The object and advantage of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is an exemplary determination result table configured to hold determination results of color determination performed by a packet arrival processing unit;

FIG. 17 is a diagram illustrating an example of a token addition table;

FIG. 19A is an exemplary flowchart of a token addition process performed by the token addition unit;

DESCRIPTION OF EMBODIMENTS

Embodiments of the present invention will be described below with reference to the drawings. However, configurations of the embodiments described below are exemplary and not intended to limit the present invention.

First Embodiment

Both policer and shaper perform packet transfer control using a function called a token bucket.

Figure 1:
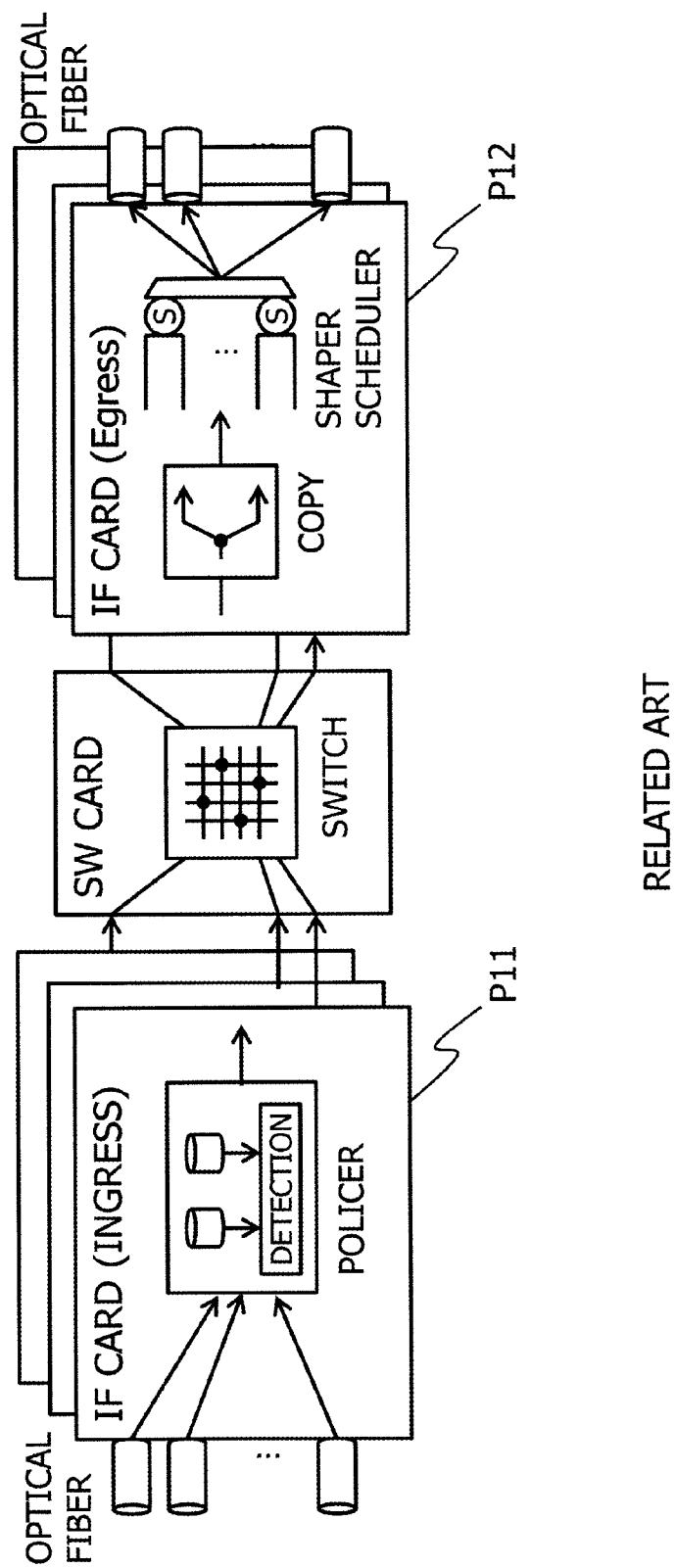
FIG. 1 is a diagram illustrating an exemplary logical configuration of a packet processing apparatus.
Figure 2:
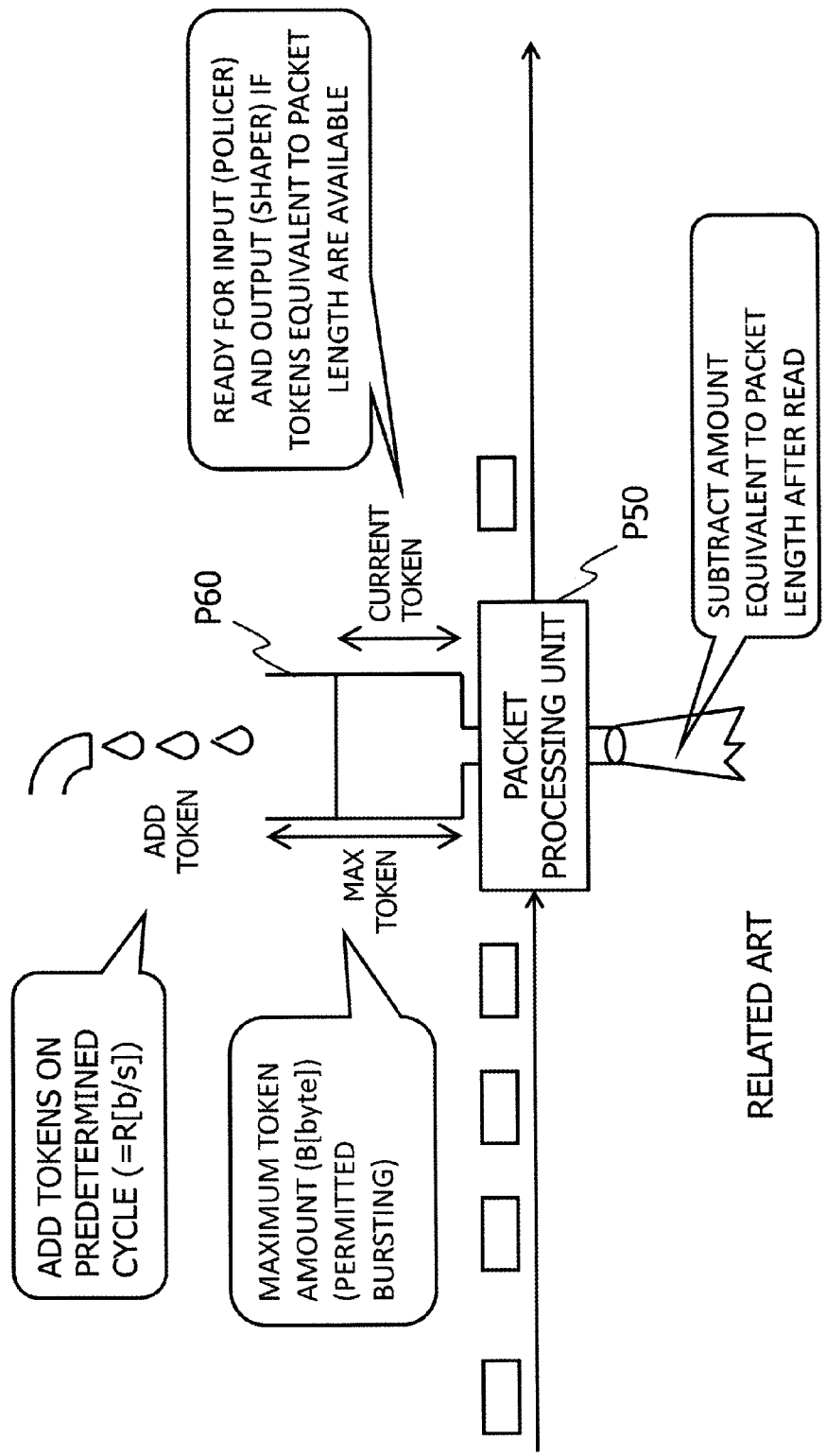
FIG. 2 is a diagram for explaining workings of a token bucket.

FIG. 2 is a diagram for explaining workings of a token bucket. A token bucket P60 is provided, for example, on the policer or shaper. Tokens that are packet transmission rights are held in the token bucket P60. By consuming an amount of tokens commensurate with an output packet from the token bucket P60, the policer/shaper can output the packet to a subsequent block. Specifically, when outputting a packet, a packet processing unit P50 that performs a packet output process with respect to the subsequent block subtracts packet length of the output packet from the amount of tokens held in the token bucket P60. Therefore, if tokens larger than the packet length are held in the token bucket P60, the packet is ready to be inputted or outputted. Hereinafter the amount of tokens held in the token bucket will be referred to as a token amount.

A maximum token amount held in the token bucket 60 is set, and a packet processing apparatus can permit bursting by the amount equivalent to the maximum token amount. A burst is a large block of data flowing into a network, resulting, for example, from a large amount of data transmission from a terminal. Also, a predetermined amount of tokens is added to the token bucket P60 on a predetermined cycle. The cycle on which tokens are added and the amount in which tokens are added are depended on a bandwidth allocated to a flow. For example, if a bandwidth is set for each flow, a token bucket is provided for each flow. The flow means a packet group whose source IP address, destination IP address, source port number, destination port number, protocol, and the like are identical.

One of examples of policing is packet coloring. The coloring is the process of determining a discard priority of a packet, for example, in a queuing or other subsequent block and is also referred to as marking. Standardization specifications of coloring include, for example, two-rate three-color policing prescribed by MEF 10 (Metro Ether Forum 10), RFC 2698 (Request For Comment 2698), and the like. Two-rate three-color policing is coloring that involves classifying packets into any of three colors—Red, Yellow, and Green—using two policers (token buckets)—CIR and EIR (Excess Information Rate)—for one flow. The EIR represents a maximum bandwidth available for communications and satisfies CIR<EIR. Token buckets corresponding to CIR and EIR are CBS (Committed Burst Size) and EBS (Excess Burst Size), respectively. The discard priority represents the ease with which packets are discarded and decreases in the order: Red>Yellow>Green.

In relation to set values of network bandwidth such as CIR and EIR, when the bandwidth of an input packet is smaller than the CIR value, the input packet is marked as Green; when the bandwidth is equal to or larger than the CIR value and smaller than EIR value, the input packet is marked as Yellow; and when the bandwidth of an input packet is equal to or larger than the EIR value, the input packet is marked as Red.

Figure 3:
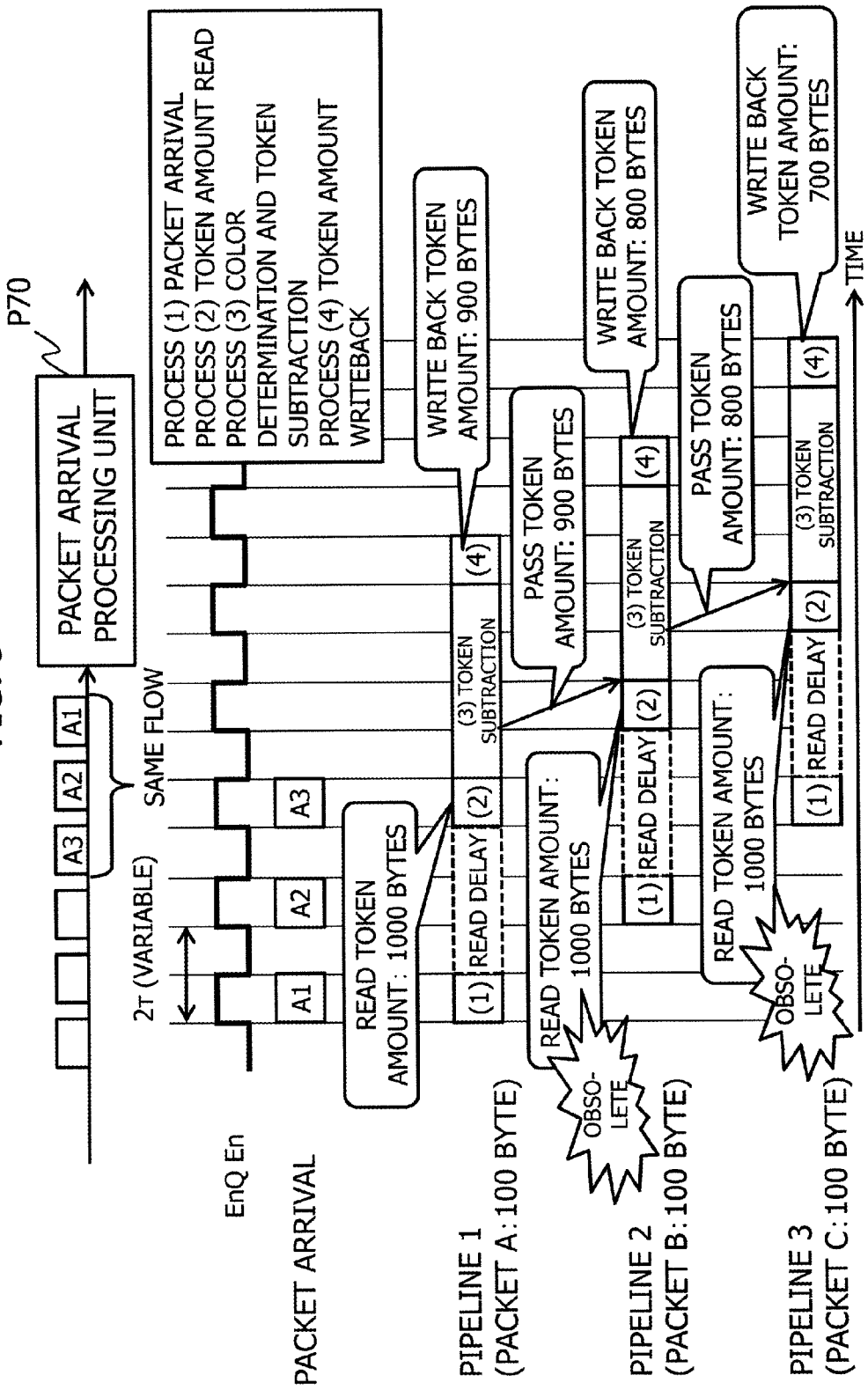
FIG. 3 is a diagram for explaining processing procedures of a policer.

FIG. 3 is a diagram for explaining processing procedures of a policer. FIG. 3 illustrates processing of packet A1, packet A2, and packet A3 performed by a packet arrival processing unit P70 adapted to perform a policer process. Packet A1, packet A2, and packet A3 belong to a same flow A. Also, it is assumed that packet A1, packet A2, and packet A3 have a packet length of 100 bytes each and arrive at the packet processing apparatus at intervals of 2 clocks.

For example, the policer that does the two-rate three-color policing described above performs processes in the order: (1) packet arrival, (2) reading out token amount from memory, (3) computations for color determination and token amount subtraction, and (4) writing back token amount into memory. Computing time taken to perform such a series of processes is longer than an interval between packet arrivals at the policer, and packets arrive newly one after another before the series of processes for one packet is finished. Therefore, if the series of processes for one packet is set to be started after the series of a previous packet has finished, a delay will be increased as a result of computations. Thus, the policer performs computational processes known as pipelines. The pipeline is a circuit incorporated in order to perform, for example, the series of processes (1) to (4) described above. Multiple pipelines are provided and each pipeline starts processing at a predetermined time with its timing shifted, for example, by the packet arrival interval. An arriving packet is assigned to the pipeline that starts processing next. Also, in the policer, one pipeline is used for each packet regardless of flows.

The number of pipelines is determined, for example, based on the computing time taken for each pipeline and the packet arrival interval. For example, if the computing time taken for each pipeline is 12 clocks and the packet arrival interval is 2 clocks, process start timing of pipelines is shifted by 2 clocks, and thus the number of pipelines is 6. For example, the 6 pipelines #1 to #6 start processing in the order: #1, #2, #3, #4, #5, #6, #1 . . . .

In FIG. 3, each packet arriving at the packet arrival processing unit P70 is assigned to the pipeline that starts processing next. In the example of FIG. 3, packet A1 is assigned to pipeline 1, packet A2 is assigned to pipeline 2, and packet A3 is assigned to pipeline 3.

On pipeline 1, after arrival of packet A1 (process (1)), the token amount of flow A is read out of memory (process (2)). At this time, on pipeline 1, it is assumed that the token amount of flow A read out of memory is 1000 bytes. Next, on pipeline 1, color determination and token subtraction for packet A1 are performed (process (3)) and packet A1 is outputted from the packet arrival processing unit P70. At this time, the packet length (100 bytes) of packet A1 is subtracted from the token amount (1000 bytes) read out in process (2) and the token amount of flow A becomes 900 bytes. The token amount of flow A, which is 900 bytes, is written back into memory (process (4)).

On pipeline 2, processing is started 2 clocks later than pipeline 1. Packet A2 arrives (process (1)), and the token amount of flow A is read out of memory (process (2)). In this case, since packet A1 processed on pipeline 1 and packet A2 processed on pipeline 2 belong to the same flow A, a same token bucket is used for packets A1 and A2. Also, pipeline 2 is run concurrently with pipeline 1 by being delayed (shifted) by 2 clocks from pipeline 1 while the time taken to complete one pipeline is longer than the shift (2 clocks) between pipeline 1 and pipeline 2. Consequently, the token amount is read out (process (2)) on pipeline 2 before the token amount writeback (process (4)) by pipeline 1 is completed. Therefore, the token amount of flow A read out in process (2) of pipeline 2 is 1000 bytes, which is the token amount before the token amount writeback (process (4)) by pipeline 1. However, at the time when pipeline 2 acquires the token amount of flow A, token subtraction has been performed by pipeline 1, and consequently the actual token amount of flow A has become 900 bytes. That is, the token amount (1000 bytes) of flow A acquired by pipeline 2 in process (2) is not up-to-date, but is obsolete, being different from the actual token amount (900 bytes) of flow A.

Thus, each pipeline holds computational data including token amounts in cache and passes the data to another pipeline. The pipeline that has received the computational data distinguishes the latest data on the same flow among the computational data received from the other pipeline and performs computations using the computational data. For example, information held in cache by each pipeline includes identification information (flow ID) on the flow to which the packet to be processed by the pipeline belongs, the token amount as computational data of the appropriate flow, and the like. The pipeline that has received the cache data distinguishes the latest cache data on the same flow, for example, based on relative positional relationship between the pipeline itself and the pipeline that has generated the cache data. Specifically, the given pipeline distinguishes the cache data held by another pipeline that processes a packet of the same flow by starting at a time before and closest to the time at which processing is started by the given pipeline, as the latest cache data on the same flow.

Description will be given of a case in which, for example, 6 pipelines #1 to #6 start processing in this order. If the cache data received by pipeline #4 from pipelines #1 to #3 belongs to the same flow, the cache data of pipeline #3 that starts processing before and closest to the time at which processing is started by pipeline #4 is distinguished as the latest. Regarding the token amount read out of memory by pipeline #4, if there is cache data received from another pipeline, priority is given to the cache data received from the other pipeline.

In the example illustrated in FIG. 3, for consistency of information, pipeline 1 holds computational data including the 900-byte token amount of flow A in cache, and thereby passes the computational data to the other pipeline. Pipeline 2 determines which is the latest, the token amount (1000 bytes) of flow A read out of memory or the token amount (900 bytes) of flow A held in cache by pipeline 1, and sorts out the computational data (token amounts). In this case, since priority is given to the token amount (900 bytes) of flow A contained in the computational data of pipeline 1, pipeline 2 performs color determination and token subtraction using the token amount of flow A held in cache by pipeline 1 (process (3)). Pipeline 2 subtracts the packet length (100 bytes) of packet A2 from the token amount (900 bytes) of flow A held in cache by pipeline 1. Consequently, the token amount of flow A becomes 800 bytes. Pipeline 2 writes back the token amount of flow A as 800 bytes into memory (process (4)).

Pipeline 3 performs similar processing. Pipeline 3 receives the computational data held in cache by pipeline 1 and the computational data held in cache by pipeline 2. Packet A3 handled by pipeline 3 belongs to the same flow A as packet A1 and packet A2. Consequently, pipeline 3 distinguishes the computational data (with a token amount of 800 bytes) of pipeline 2 as the latest among the computational data of pipeline 1 and computational data of pipeline 2 held in cache and the token amount read out of memory. This is because pipeline 2 starts processing before and closest to the time at which processing is started by pipeline 3. Pipeline 3 writes back the token amount (700 bytes) obtained by subtracting the packet length (100 bytes) of packet A3 from the computational data (with a token amount of 800 bytes) of pipeline 2 into memory.

As described above, the policer performs computations using one pipeline for each packet regardless of flows. Therefore, if there are two or more pipelines that process packets belonging to the same flow, contention can occur for a same memory value (token bucket) between/among the pipelines, each of which perform a series of processes including a read, change, and writeback. This causes discrepancies between the token amounts acquired by the pipelines from memory and the actual token amount at that point. To solve the discrepancies, each pipeline holds computational data (token amounts) in cache. Then, the computational data is exchanged among the pipelines and sorted out to select the computational data (token amounts) to be used. This could increase a scale of arithmetic circuitry or reduce operating speed of the packet processing apparatus.

With a packet processing apparatus according to a first embodiment, one pipeline is allocated to one flow containing a predetermined number of successive packets rather than one pipeline is allocated to one packet. The packet processing apparatus according to the first embodiment will be described in detail below.

Figure 4:
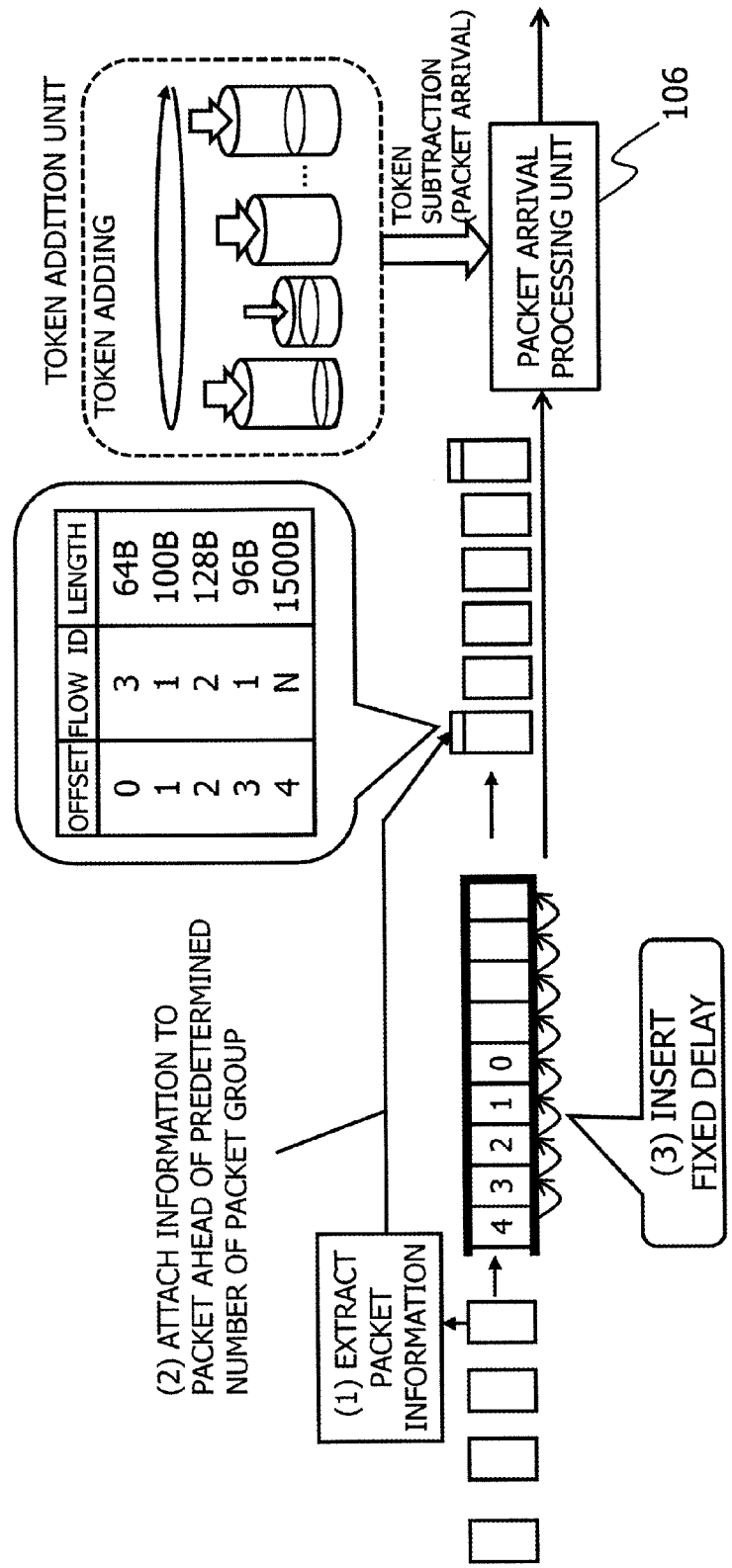
FIG. 4 is a diagram illustrating exemplary processes of a packet processing apparatus according to a first embodiment.

FIG. 4 is a diagram illustrating exemplary processes of the packet processing apparatus according to the first embodiment. Processes related to a policer on an interface card is illustrated in FIG. 4. A packet arrival processing unit 106 is a processing unit that does policing. According to the first embodiment, first, (1) information is extracted from each packet before the packet is inputted to the packet arrival processing unit 106. The information extracted includes, for example, an ID of the flow to which the packet belongs, packet length, and the like. Next, (2) information extracted from a predetermined number of successive packets are put together, and the resulting information is attached, for example, to an internal header of a packet preceding the predetermined number of successive packets. The internal header is a header effective within the packet processing apparatus. Also, (3) a predetermined delay is insert before the packets. Consequently, information about the predetermined number of successive packets is acquired before the predetermined number of successive packets are inputted to the packet arrival processing unit 106.

A process intended to avoid contention between series of processes including a read, change, and writeback for the same memory value (token bucket) is performed based on the information about the predetermined number of packets. Hereinafter a series of processes including a read, change, and writeback with respect to the same memory value (token bucket) will be referred to as a "series of processes for the memory." In the first embodiment, the contention between/among the series of processes for the memory is a concurrent existence of multiple series of processes, such as described above, with respect to the token bucket of the same flow. For example, this is equivalent to concurrent processing of packets in the same flow by plural pipelines, in the example illustrated in FIG. 3. A process intended to avoid contention between the series of processes for the memory involves, for example, performing computations on the packets belonging to the same flow all together out of the predetermined number of packets based on the information about the predetermined number of packets acquired before the predetermined number of packets are inputted to the packet arrival processing unit 106. The computations include, for example, color determination and token subtraction for the packets.

By performing computations on the packets belonging to the same flow all together before input to the packet arrival processing unit 106 in relation to the predetermined number of successive packets, it is possible to avoid contention for the memory between the series of processes performed on the packets belonging to the same flow.

<Configuration of Packet Processing Apparatus>

Figure 5:
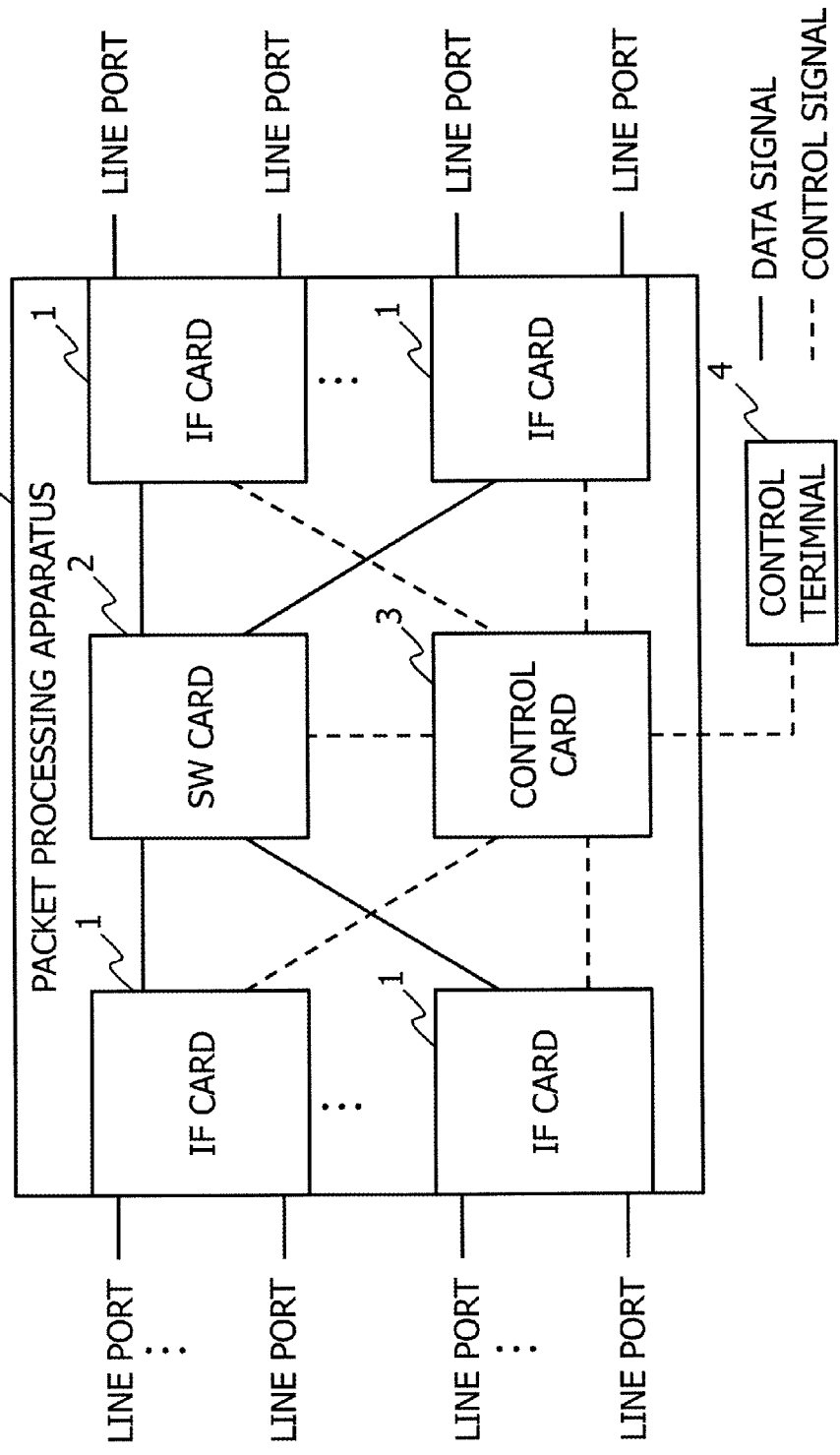
FIG. 5 is a diagram illustrating an exemplary configuration of the packet processing apparatus.

FIG. 5 is a diagram illustrating an exemplary configuration of the packet processing apparatus 100. The packet processing apparatus 100 is, for example, an apparatus such as a router or switch. However, this is not restrictive, and the packet processing apparatus 100 may be an interface card contained in a router, switch, or the like. In the first embodiment, the packet processing apparatus 100 is described as being a router, switch, or the like. The packet processing apparatus 100 includes plural IF cards 1, an SW card 2 relaying packets among the plural IF cards 1, and a control card 3 controlling the various cards of the packet processing apparatus 100. QoS functions such as a policer, shaper, and scheduler are provided in the IF cards 1.

Figure 6:
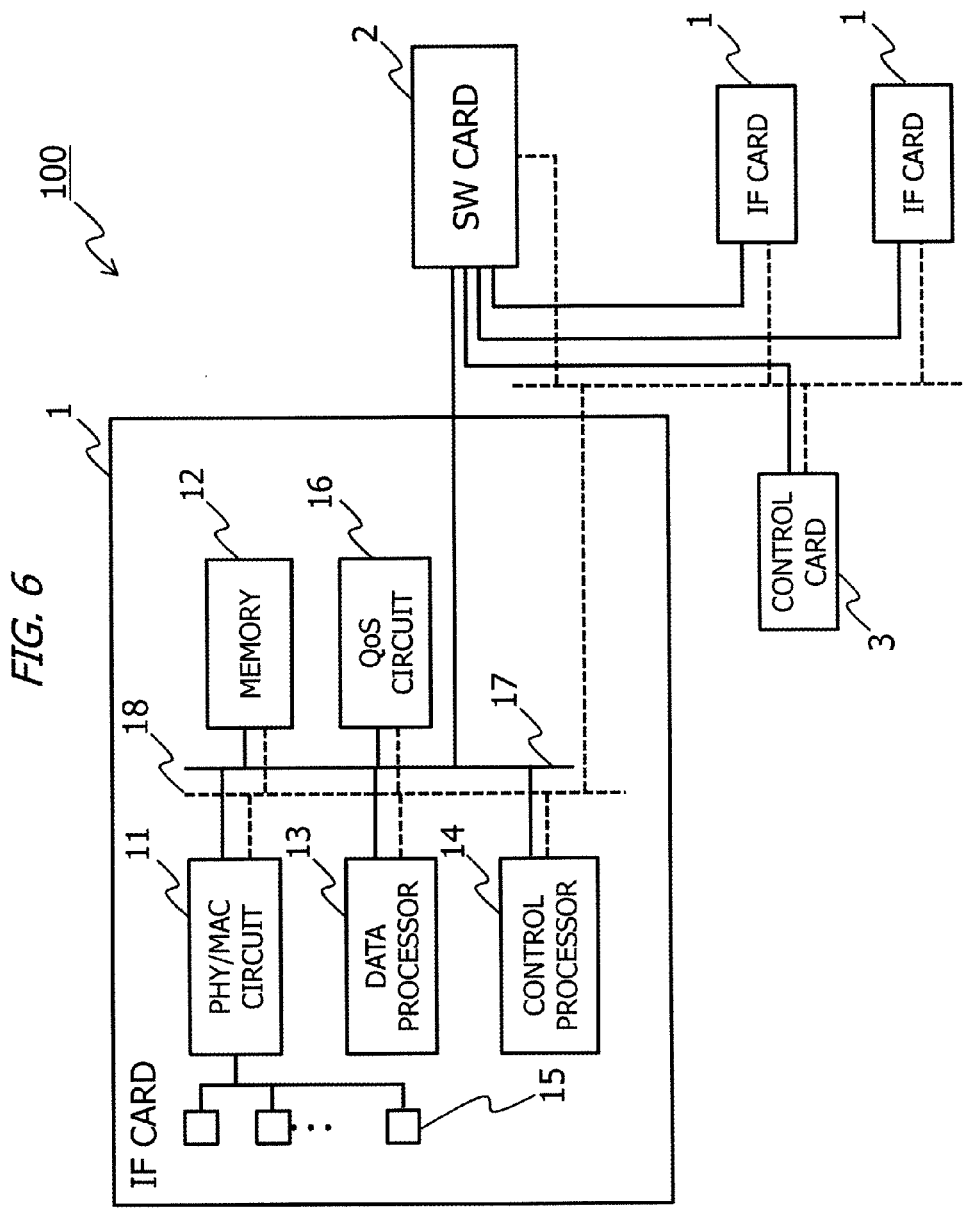
FIG. 6 is a diagram illustrating an exemplary hardware configuration of an IF card.

FIG. 6 is a diagram illustrating an exemplary hardware configuration of the IF card 1. The IF card 1 includes a PHY/MAC (PHYsical layer/MAC layer) circuit 11, a memory 12, a data processor 13, a control processor 14, plural ports 15, and a QoS circuit 16. The plural ports 15 are connected to the PHY/MAC circuit 11. The PHY/MAC circuit 11, memory 12, data processor 13, control processor 14, and QoS circuit 16 are connected to both data bus 17 and control bus 18. In FIG. 6, the data bus is indicated by a solid line and the control bus is indicated by a dotted line. Incidentally, in FIG. 6, an address bus is omitted.

The PHY/MAC circuit 11 terminates both physical layer and MAC layer of a receive frame accepted as input from each of the ports 15. The memory 12 includes, for example, a volatile memory such as an SRAM (Static Random Access Memory) or DRAM (Dynamic Random Access Memory) as well as a non-volatile memory such as a PROM (Programmable Read Only Memory). The memory 12 stores various programs and data.

The data processor 13 is a processor, such as NPU (Network Processing Unit) or data communications processor, adapted to process data related to communications. The data processor 13 processes a frame encoded by the PHY/MAC circuit 11 and a frame transferred from the SW card 2. The control processor 14 is, for example, a CPU (Central Processing Unit). The control processor 14 manages the PHY/MAC circuit 11, memory 12, data processor 13, and QoS circuit 16.

The QoS circuit 16 includes, for example, a policer circuit as an input-side function and a shaper circuit and scheduler circuit as output-side functions. The policer circuit, shaper circuit, and scheduler circuit are, for example, FPGAs (Field Programmable Gate Arrays) or ASICs (Application Specific Integrated Circuits).

Each of the PHY/MAC circuit 11, memory 12, data processor 13, control processor 14, and QoS circuit 16 contained in the IF card 1 may be a separate device or chip. Also, the IF card 1 may be one or more LSIs (Large Scale Integrations) containing the above circuits and devices.

Also, the hardware configuration of the IF card 1 is not limited to the one illustrated in FIG. 6, and additions, deletions, or replacements may be made as appropriate. The data processor 13 and control processor 14 may be a single processor functioning as both.

Figure 7:
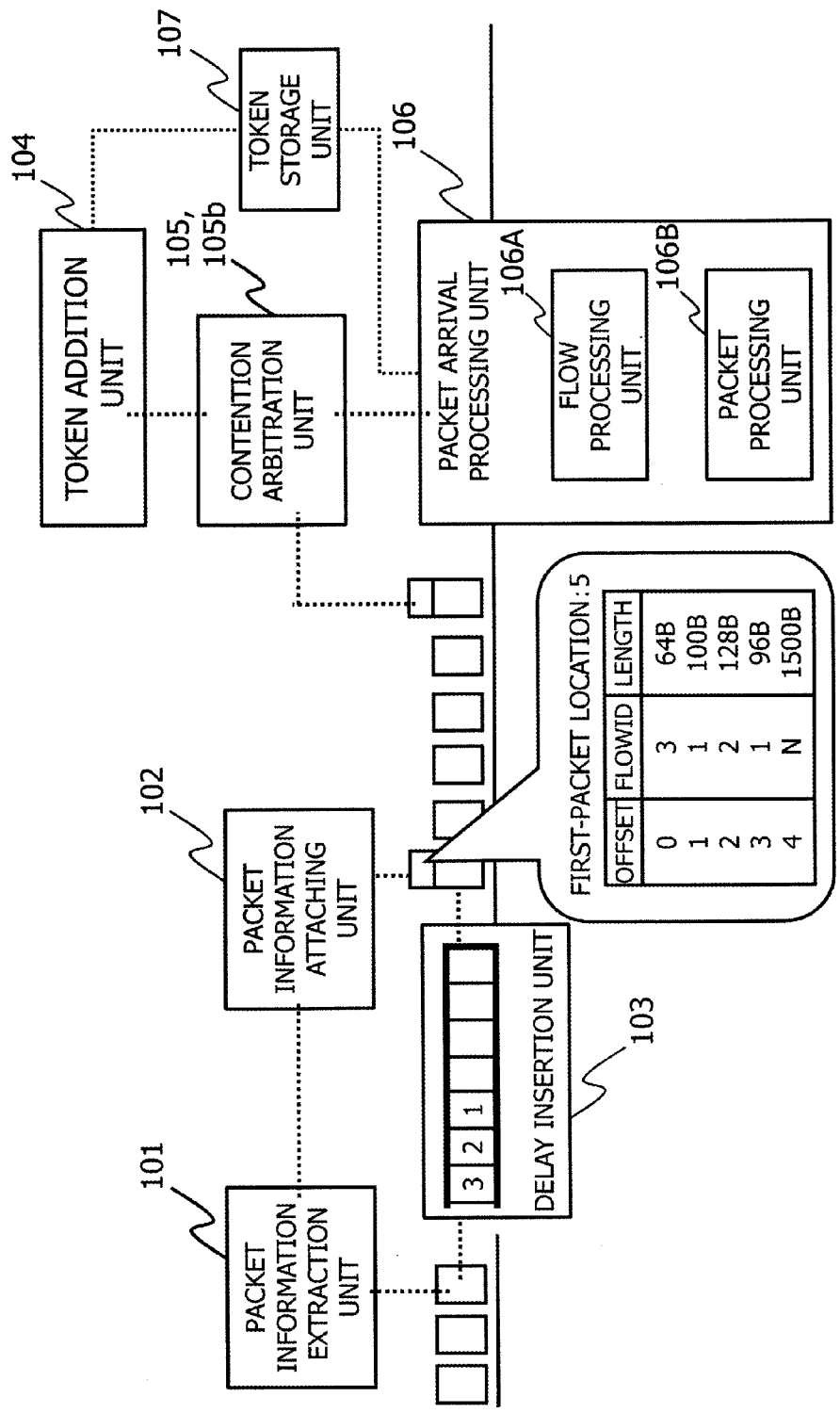
FIG. 7 is an exemplary functional block diagram of a QoS circuit.

FIG. 7 is an exemplary functional block diagram of the QoS circuit 16. FIG. 7 illustrates that block of the QoS circuit 16 which serves the function of the policer on the input side. The QoS circuit 16 includes a packet information extraction unit 101, a packet information attaching unit 102, a delay insertion unit 103, a token addition unit 104, a contention arbitration unit 105, and a packet arrival processing unit 106. These components are implemented as electric or electronic circuits, FPGAs, ASICs, or the like. These functional blocks are exemplary, and plural functional blocks may be combined into a single functional block as appropriate. Also, these functional blocks may be configured as a single circuit containing all of the functional blocks. Also, plural blocks may be produced by combining two or more functional blocks into a single block and configuring each of the blocks with a single FPGA or ASIC. For example, the packet information extraction unit 101, packet information attaching unit 102, and delay insertion unit 103 may be configured as a single FPGA or ASIC, and the token addition unit 104, contention arbitration unit 105, and packet arrival processing unit 106 may be configured as another FPGA or ASIC.

The packet information extraction unit 101 extracts information from each packet arriving at the IF card 1. The extracted information will be referred to hereinafter as "packet information." The packet information includes, for example, flow ID and packet length. The flow ID is identification information about a flow and is stored, for example, in the internal header of the packet. The packet length is packet size and is contained, for example, in a packet length field of a packet header or in the internal header. The extracted packet information is outputted to the packet information attaching unit 102. The packet is inputted to the delay insertion unit 103. The packet information extraction unit 101 is an example of an "extraction unit."

As packet information is accepted as input from the packet information extraction unit 101, the packet information attaching unit 102 puts together the packet information on a predetermined number of successive packets and attaches the resulting information, for example, to the internal header of the packet a predetermined number of packets earlier than the predetermined number of successive packets. The predetermined number of successive packets will be referred to hereinafter as "a packet group." Also, information obtained by putting together the information about the packets included in the packet group will be referred to hereinafter as "packet group information." The internal header of the packet, which is effective within the packet processing apparatus, is attached by an input-side IF card before input to the QoS circuit, and removed by the input-side IF card or an output-side IF card. The internal header contains information such as IF card number, port number, packet length, flow ID, and queue ID, where the IF card number is the card number of the IF card at a transfer destination of the packet within the packet processing apparatus 100.

The packet with the packet group information attached to its internal header is also attached with a first-packet location of the packet group in addition to the packet group information. The first-packet location is information that represents the location of the first packet of the packet group relative to the packet attached with the packet group information. For example, the first-packet location is expressed as the number of packets included between the packet attached with the packet group information and the first packet of the packet group. For example, in the example of FIG. 7, since the packet group information is attached to the packet five packets earlier than the first packet of the packet group, the first-packet location is 5.

The number of packets included in the packet group is determined depending on, for example, the number of pipeline stages. Also, the packet group information is attached, for example, to the packet arriving earlier by the number of packets in the packet group than the first packet of the packet group.

For example, if there are 6 pipelines, since up to 6 flows can be processed concurrently, the number of packets included in each packet group is 6. If the number of packets included in a packet group is 6, information about the packet group is attached, for example, to the packet six packets earlier than the first packet of the packet group. In this case, the first-packet location of the packet group is "6." However, this is not restrictive, and it is sufficient if the packet group information is attached to such a preceding packet that will at least allow enough time to complete the color determination and the like of the first packet before the first packet of the packet group arrives.

The packet group information contains, for example, packet information (flow ID and packet length) on each packet of the packet group as well as offset. The offset represents the position counting from the first packet of the packet group with 0 being assigned to the first packet. For example, the packet with an offset of 3 indicates that the packet is the fourth packet from the top of the packet group.

The delay insertion unit 103 inserts a fixed delay before an input packet, where the fixed delay is the sum of the number of packets included in a packet group and the number of packets included between the packet attached with the packet group information and the first packet of the packet group. The delay insertion unit 103 is, for example, a FIFO (First In First Out) queue. The fixed delay inserted by the delay insertion unit 103 is used to extract the packet information on all the packets included in one packet group and report the packet group information before the packet group arrives at the packet arrival processing unit 106. For example, if the number of packets included in a packet group is five and the packet group information is attached to the packet five packets earlier than the first packet of the packet group, the delay insertion unit 103 inserts a fixed delay of nine packets before the input packet. The packet outputted from the delay insertion unit 103 is inputted to the packet arrival processing unit 106.

The token addition unit 104 adds a predetermined amount of tokens to the token bucket provided for each flow, on a predetermined cycle. Also, for example, when the two-rate three-color policing is done, each flow is provided with two token buckets: CIR and EIR. Incidentally, the token bucket is something virtual, and actually the token amount of each token bucket is stored in a memory corresponding to a token storage unit 107 described later. The token addition unit 104 is an example of an "addition unit."

The token storage unit 107 stores the token amount of each token bucket. The token storage unit 107 is, for example, a volatile memory provided in the QoS circuit 16, and the token amounts of token buckets are stored in storage areas of the memory allocated to the respective token buckets. According to the first embodiment, the token addition unit 104 and packet arrival processing unit 106 read the token amount stored in the token storage unit 107, add or subtract the token amount, and write the token amount back into the token storage unit 107. The token storage unit 107 is an example of a "storage unit."

The packet arrival processing unit 106 includes a flow processing unit 106A and packet processing unit 106B. The flow processing unit 106A includes plural pipelines performing a token subtraction process and color determination process on a flow by flow basis. Specifically, each pipeline of the flow processing unit 106A determines the color of the packet, for example, by doing two-rate three-color policing as the color determination process. Also, as the token subtraction process, the pipeline of the flow processing unit 106A, for example, reads the token amount of the token bucket of an appropriate flow out of the token storage unit 107, subtracts token corresponding to the packet length from the token amount read out, and writes the token amount back into the token storage unit 107 again. A determination result of color determination for each of the packets included in the packet group is held, for example, in a determination result table (described later).

The packet processing unit 106B attaches the color determination result to each arriving packet based on processing results produced by the flow processing unit 106A, i.e., on the determination result table, and outputs the packet to a subsequent block. The packet arrival processing unit 106 is an example of a "packet processing unit."

The contention arbitration unit 105 detects the packet attached with the packet group information and acquires the packet group information from the packet before the packet is inputted to the packet arrival processing unit 106. For example, the contention arbitration unit 105 is bus-connected to a data signal line connected to the packet arrival processing unit 106 and acquires copies of packets inputted to the packet arrival processing unit 106. Consequently, the contention arbitration unit 105 detects the packet attached with the packet group information from among the packets inputted to the packet arrival processing unit 106 and thereby acquires the packet group information.

Upon acquiring the packet group information, the contention arbitration unit 105 assigns the flows in the packet group to the pipelines of the flow processing unit 106A and passes the packet information about the packets contained in the assigned flows to the respective pipelines of the flow processing unit 106A. The contention arbitration unit 105 is an example of a "contention handling unit."

FIG. 8 is an exemplary determination result table configured to hold determination results of color determination performed by the flow processing unit 106A. The determination result table is stored, for example, in a memory provided on hardware corresponding to the packet arrival processing unit 106. The determination result table contains, for example, Offset, Flow ID, Packet Length, Computation Result, and Color Determination Result fields of each packet included in one packet group. Out of these fields, information contained in the Offset, Flow ID, and Packet Length is acquired from the packet group information. Computation Result indicates whether or not color determination and token subtraction have been finished. If the Computation Result field contains "Completed," this means that color determination and token subtraction processes for the given packet have been completed. Color Determination Result contains the color determination result of the given packet. FIG. 8 illustrates an example of a table for two-rate three-color policing. If the Computation Result field contains "Completed," Color Determination Result contains any one of "Green," "Yellow," and "Red."

In the determination result table, for example, when the contention arbitration unit 105 newly acquires packet group information and the flow processing unit 106A performs color determination and token subtraction processes based on the packet group information, appropriate entries corresponding to the entry of Offset are overwritten and updated.

Figure 9:
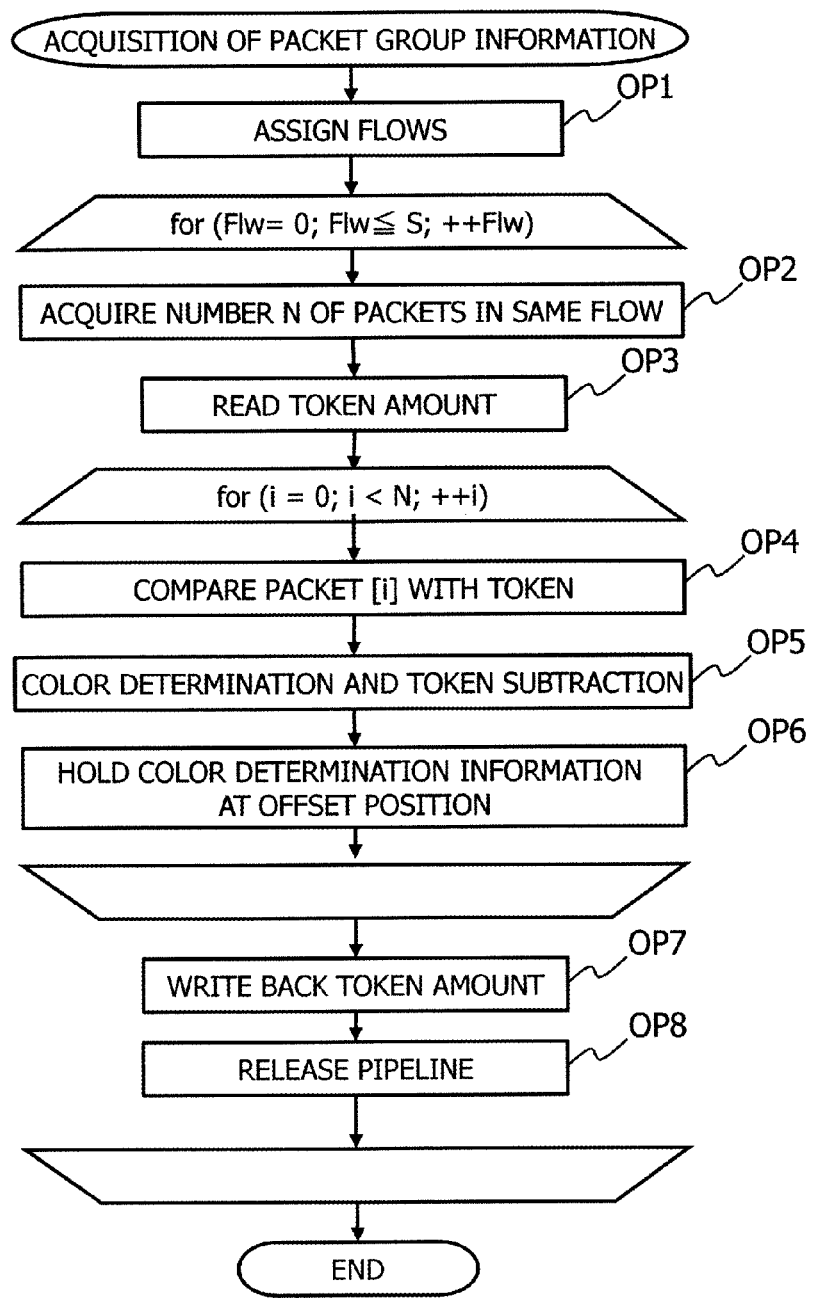
FIG. 9 is an exemplary flowchart of processes performed by a contention arbitration unit and flow processing unit upon input of packet group information.

FIG. 9 is an exemplary flowchart of processes performed by the contention arbitration unit 105 and flow processing unit 106A upon input of packet group information. The flowchart presented in FIG. 9 is executed each time the contention arbitration unit 105 acquires packet group information. Also, the flowchart presented in FIG. 9 involves two-rate three-color policing. However, the policing that is done is not limited to two-rate three-color policing.

In OP1, the contention arbitration unit 105 detects flows included in the packet group and packets belonging to each flow from packet group information. The contention arbitration unit 105 assigns the flows included in the packet group to the pipelines of the flow processing unit 106A and passes the packet information about the packets contained in the assigned flows to the respective pipelines of the flow processing unit 106A. Incidentally, the number of flows to which the packets included in a packet group belong is not always the same as the number of pipelines in the flow processing unit 106A, and may be smaller. When the number of flows is smaller, as many pipelines as the number of flows are used, with the remaining pipelines left unused.

The processes of OP2 to OP8 described below are performed by the pipelines of the flow processing unit 106A assigned with flows, and are performed as many times as there are flows Flw in the packet group. However, because of the pipeline processing, a set of the processes of OP2 to OP8 corresponding to each pipelines which is assigned a flow are performed concurrently. The variable Flw in FIG. 9 represents a number assigned, beginning with 0, to the flows included in the packet group, for example, in the order in which the flow appears in the packet group. The variable Flw has an initial value of 0. Also, the variable Flw is an integer that satisfies 0≤Flw≤S, where S is the number of pipelines.

In OP2, each pipeline of the flow processing unit 106A acquires the number N of packets belonging to the flow in the pipeline's charge, where N satisfies 0<N≤ the number of packets included in the packet group. The number of packets belonging to the flow in the pipeline's charge is, for example, acquired based on the number of pieces of packet information handed over in OP1. Alternatively, the number of packets belonging to the flow in the pipeline's charge may be handed over together with the packet information in OP1.

Next, in OP3, the pipeline of the flow processing unit 106A reads the token amount of the flow in the pipeline's charge out of the token storage unit 107 and holds the token amount, for example, in a cache.

Subsequently, the processes of OP4 to OP6, which correspond to token subtraction and color determination processes, are repeated the same number of times as the number N of packets belonging to the flow in the pipeline's charge based on the packet information about the packets contained in the flow in the pipeline's charge. The packets processed in OP4 to OP6 are referred to as target packets i. The variable i represents a number assigned, in order of ascending offsets, to the packets belonging to the flow assigned to the pipeline, where 0≤i<N.

In OP4, the pipeline of the flow processing unit 106A compares the packet length of the target packet i with the token amount of an appropriate flow held, for example, in cache. Next, the processing goes to OP5.

In OP5, the pipeline of the flow processing unit 106A performs color determination and token subtraction based on results of the comparison made in OP4 between the token amount and the packet length of the target packet i. Specifically, color determination is performed, for example, as follows. If the packet length of the target packet i is smaller than the token amount of CBS, the pipeline of the flow processing unit 106A determines the color of the target packet i to be Green. If the token amount of CBS is smaller than the packet length of the target packet i while the packet length of the target packet i is smaller than the token amount of EBS, the pipeline of the flow processing unit 106A determines the color of the target packet i to be Yellow. If the token amount of EBS is smaller than the packet length of the target packet i, the contention arbitration unit 105 determines the color of the target packet i to be Red. In the token subtraction process, the pipeline of the flow processing unit 106A subtracts the packet length of the target packet i from the token amount held, for example, in cache.

In OP6, the pipeline of the flow processing unit 106A records the color determination result of the target packet i, for example, in the Color Determination Result Field of the appropriate entry of the determination result table. Subsequently, if any of the packets belonging to the flow assigned to the pipeline remain to be subjected to the color determination and token subtraction processes, the processes of OP4 to OP6 are repeated. When all the packets belonging to the flow assigned to the pipeline have been subjected to the color determination and token subtraction processes, the processing goes to OP7.

In OP7, the pipeline of the flow processing unit 106A writes the token amount held, for example, in cache back into the token storage unit 107. The token amount written back at this time is the value obtained by subtracting the sum total of the packet lengths of the packets belonging to the flow assigned to the pipeline from the token amount read out of the token storage unit 107 in OP3. Next, the processing goes to OP8.

In OP8, the pipeline of the flow processing unit 106A is released. Specifically, for example, the pipeline of the flow processing unit 106A releases the cache used for the pipeline processing in OP2 to OP7. Then, the processes illustrated in FIG. 9 are finished.

Figure 10:
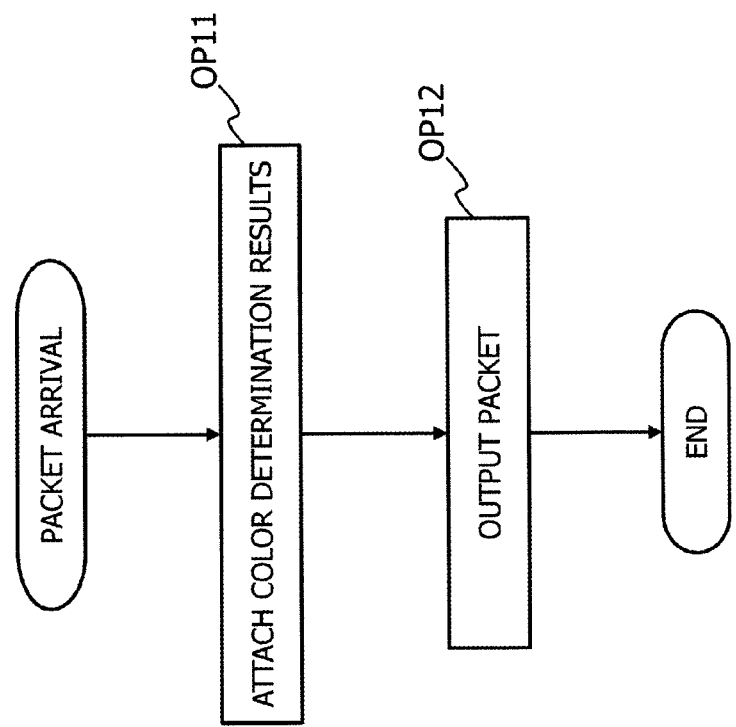
FIG. 10 is an exemplary flowchart illustrating processes performed by packet arrival processing unit upon arrival of a packet.

FIG. 10 is an exemplary flowchart illustrating processes performed by the packet processing unit 106B upon arrival of a packet. The flowchart presented in FIG. 10 is executed each time a packet arrives at the packet arrival processing unit 106.

In OP11, the packet processing unit 106B reads the color determination result corresponding to the offset of the arriving packet out of the determination result table, and attaches the color determination result to the internal header of the arriving packet. Then, the processing goes to OP12, in which the packet processing unit 106B outputs the arriving packet to a next block. Then, the processes illustrated in FIG. 10 are finished.

Figure 11:
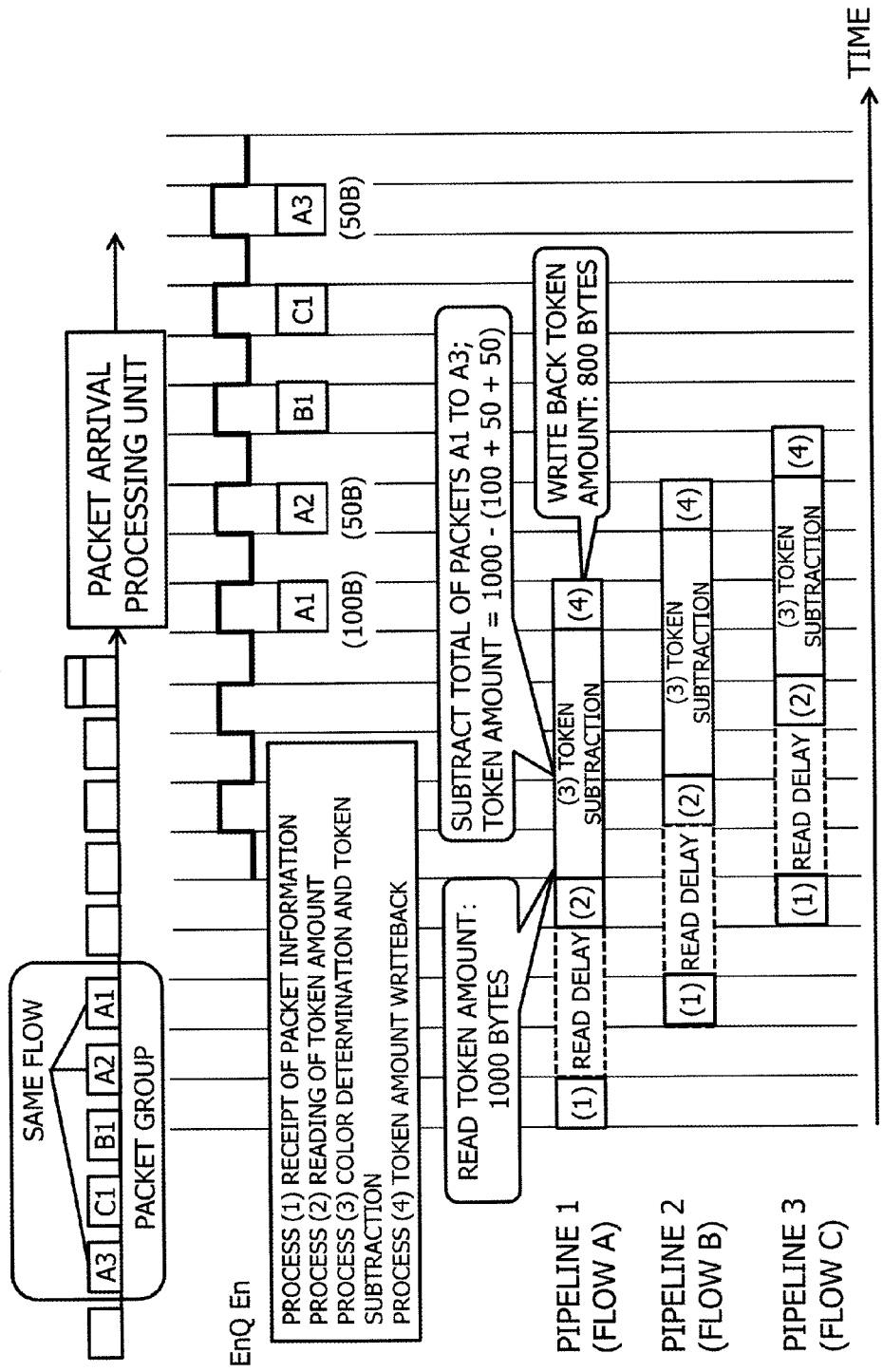
FIG. 11 is a diagram illustrating an exemplary operation of packet arrival processing according to the first embodiment.

FIG. 11 is a diagram illustrating an exemplary operation of packet arrival processing according to the first embodiment. In the example illustrated in FIG. 11, one packet group includes five packets. The example illustrated in FIG. 11 involves processing of the packet group that includes packet A1, packet A2, packet B1, packet C1, and packet A3 in this order. Thus, assuming that packet A1 has an offset of 0, packet A2, packet B1, packet C1, and packet A3 have offsets 1 to 4, respectively.

Also, packet A1, packet A2, and packet A3 belong to the same flow A. Packet B1 belongs to flow B and packet C1 belongs to flow C. It is assumed that packet A1 is 100 bytes, that packet A2 is 50 bytes, and that packet A3 is 50 bytes. Also, in the example illustrated in FIG. 11, it is assumed that the packet group information is attached to the packet five packets earlier than the first packet A1 of the packet group.

Upon acquiring packet group information, the contention arbitration unit 105 assigns the flows included in the packet group to the pipelines of the flow processing unit 106A. For example, the contention arbitration unit 105 assigns flow A included in the packet group to pipeline 1, flow B to pipeline 2, and flow C to pipeline 3 (OP1 in FIG. 9). The packet information about packet A1, packet A2, and packet A3 are passed to pipeline 1. The packet information about packet B1 is passed to pipeline 2. The packet information about packet C1 is passed to pipeline 3.

Pipeline 1 reads the token amount of flow A put under the charge of pipeline out of the token storage unit 107 (process (1), process (2); OP2 and OP3 in FIG. 9). It is assumed that the token amount read out at this time is 1000 bytes.

Packet A1 belongs to flow A. Packet A2 and packet A3 also belong to flow A. Therefore, on pipeline 1, the total packet length (200 bytes) of packet A1 (100 bytes), packet A2 (50 bytes), and packet A3 (50 bytes) is subtracted from the token amount of flow A (1000 bytes) (process (3); OP4 to OP6 in FIG. 9). Also, on pipeline 1, color determination is performed for packet A1, packet A2, and packet A3. Next, pipeline 1 writes a token amount of 800 byte back into the token storage unit 107 (process (4); OP7 in FIG. 9).

Subsequently, when packet A1 arrives at the packet arrival processing unit 106, since packet A1 have already been subjected to token subtraction and color determination, the packet arrival processing unit 106 outputs the color determination result by attaching the color determination result to the internal header of packet A1 (OP11 to OP12 in FIG. 10). Also, upon arrival of packet A2 and packet A3, the packet arrival processing unit 106 similarly outputs the color determination results by attaching the color determination results to the internal headers of packet A2 and packet A3 with reference to the determination result table.

As described above, the token subtraction and color determination for packet A1, packet A2, and packet A3 belonging to flow A are handled by a single pipeline. Similarly, packet B1 and packet C1 are each handled by a single pipeline.

<Operation and Effects of First Embodiment>

Figure 12:
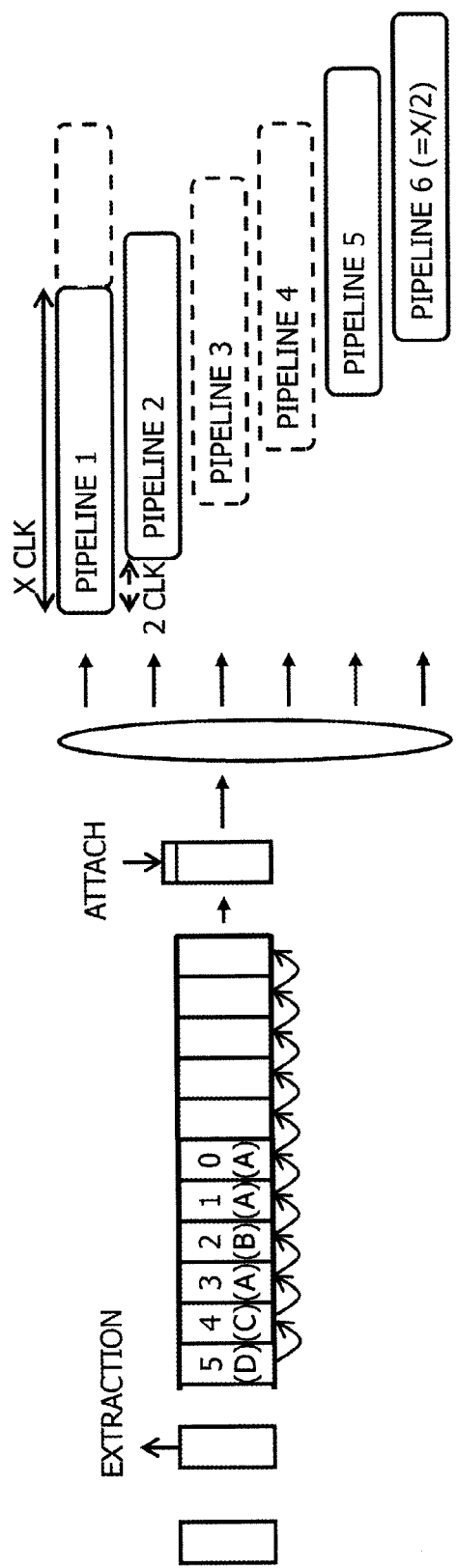
FIG. 12 is a diagram for explaining operation and effects of the first embodiment.

FIG. 12 is a diagram for explaining operation and effects of the first embodiment. With the packet processing apparatus 100 according to the first embodiment, information about each input packet is extracted, and information about a predetermined number of input packets (packet group information) is reported to the contention arbitration unit 105 before input to the packet arrival processing unit 106. The contention arbitration unit 105 assigns the flows among the predetermined number of packets (packet group) to the pipelines of the flow processing unit 106A and passes the packet information about the packets contained in each flow to the appropriate pipeline. The pipelines of the flow processing unit 106A perform token subtraction and color determination for the predetermined number of packets using the information about the predetermined number of packets (packet group information) before arrival of the packets at the packet arrival processing unit 106. This makes it possible to avoid contention between series of processes including reads, changes, and writebacks with respect to the token amount.

Also, since token subtraction and color determination are performed on a flow by flow basis, the number of pipelines used equals the number of flows included in the packet group. In the example illustrated in FIG. 12, the packets with offsets of 0, 1, and 3, respectively, belong to the same flow A. The packet with an offset of 2 belongs to flow B, the packet with an offset of 4 belongs to flow C, and the packet with an offset of 5 belongs to flow D. Therefore, in the example illustrated in FIG. 12, four pipelines of the flow processing unit 106A are used—this number is equal to the number of flows included in the packet group.

Thus, in the first embodiment, since one pipeline is used per flow, there is no need to exchange cache data among pipelines and hold cache data on a pipeline by pipeline basis unlike when one pipeline is used per packet. Also, unlike when one pipeline is used per packet, there is no need to sort out cache data on the receiving side of the cache data. Since logic circuits needed for the processes of holding, exchanging, and sorting out cache data are not used, the packet processing apparatus 100 according to the first embodiment can reduce circuit scales. Also, since there is no need to exchange cache data among pipelines or sort out the cache data by causing memory read delays, devices can be operated at high clock rates, i.e., at high speed.

If the processing time taken for computational processes (processes ranging from token read to token subtraction to color determination to token writeback) of one pipeline is X clocks and a packet arrival interval is 2 clocks, then the number of pipelines is $\lambda/2$. Therefore, a maximum number of packets included in a packet group is $\lambda/2$. According to the first embodiment, it is sufficient if the number of packets accumulated in the FIFO queue used as the delay insertion unit 103 is the number of packets included in the packet group plus the number of packets included between the first packet and the packet attached with the packet group information. This reduces memory size of the FIFO queue used as the delay insertion unit 103, thereby reducing the circuit scale of the packet processing apparatus 100. Note that the techniques described in the first embodiment are applicable not only to policers, but also, for example, to schedulers and shapers that perform pipeline processing.

<Variation of Packet Group Information Reporting>

According to the first embodiment, packet group information is attached to the internal header of a packet existing ahead of the first packet of the packet group and is reported to the contention arbitration unit 105. The method for reporting the packet group information is not limited to this, and may be, for example, the one described below.

Figure 13:
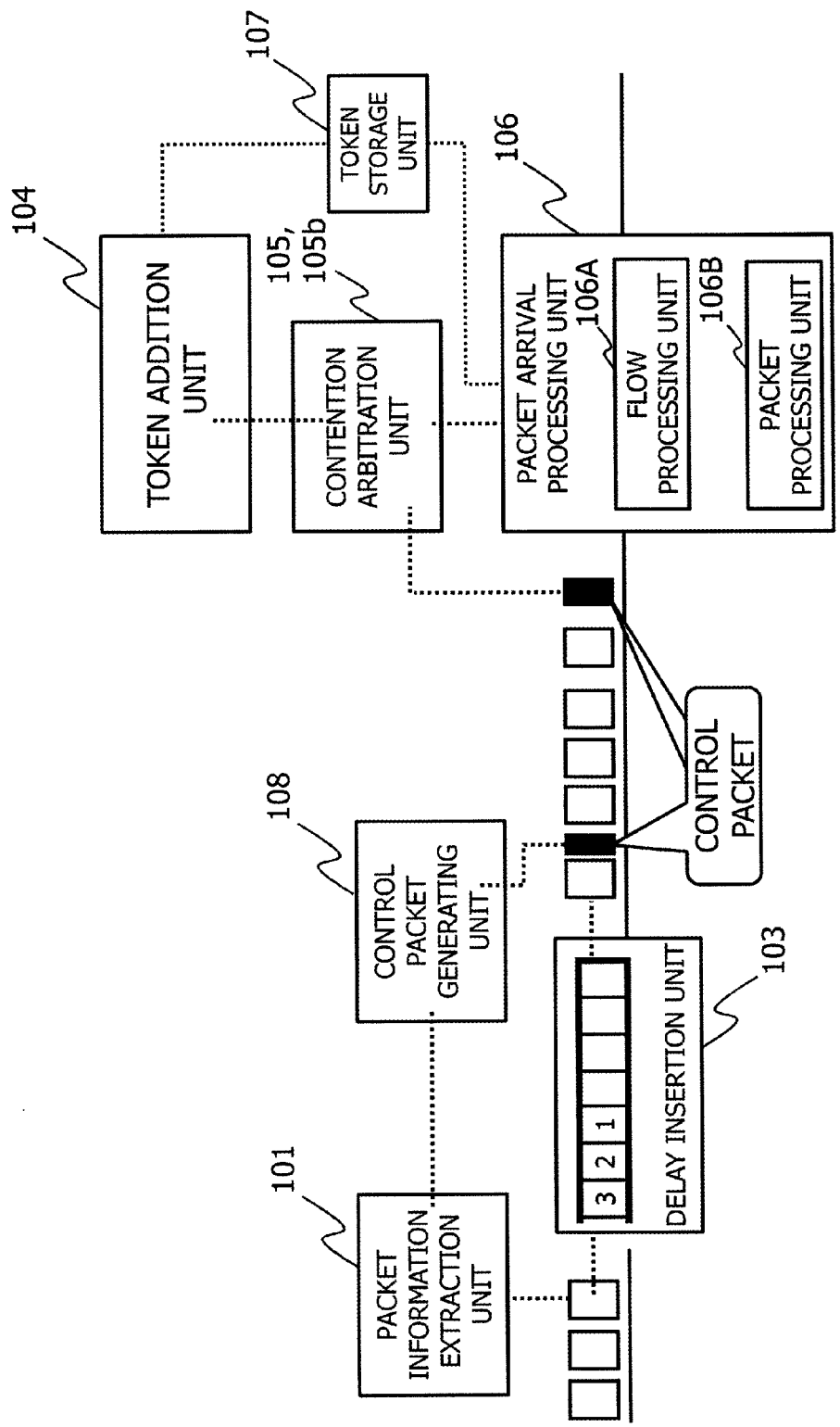
FIG. 13 is a diagram illustrating a variation of packet group information reporting.

FIG. 13 is a diagram illustrating a variation of packet group information reporting. This variation of packet group information reporting uses a control packet. In this variation, the packet processing apparatus 100 includes a control packet generating unit 108 instead of the packet information attaching unit 102.

As packet information on individual packets is accepted as input from the packet information extraction unit 101, the control packet generating unit 108 puts together the packet information on a predetermined number of successive packets and puts the resulting information as packet group information in the control packet. The control packet generating unit 108 inserts the control packet before the packet that arrives earlier by the number of packets contained in the packet group than the first packet of the packet group. In addition to the packet group information, position information about the first packet of the packet group is stored in the control packet. The position information about the first packet of the packet group is, for example, the number of packets included between the control packet and the first packet of the packet group.

The control packet contains identification information, for example, in its header, where the identification information indicates that the packet is intended to report packet group information and allows the contention arbitration unit 105 to identify the control packet.

Upon receiving the control packet, the contention arbitration unit 105 extracts the packet group information and performs the processes described in the first embodiment. Subsequently, the control packet is discarded.

Figure 14:
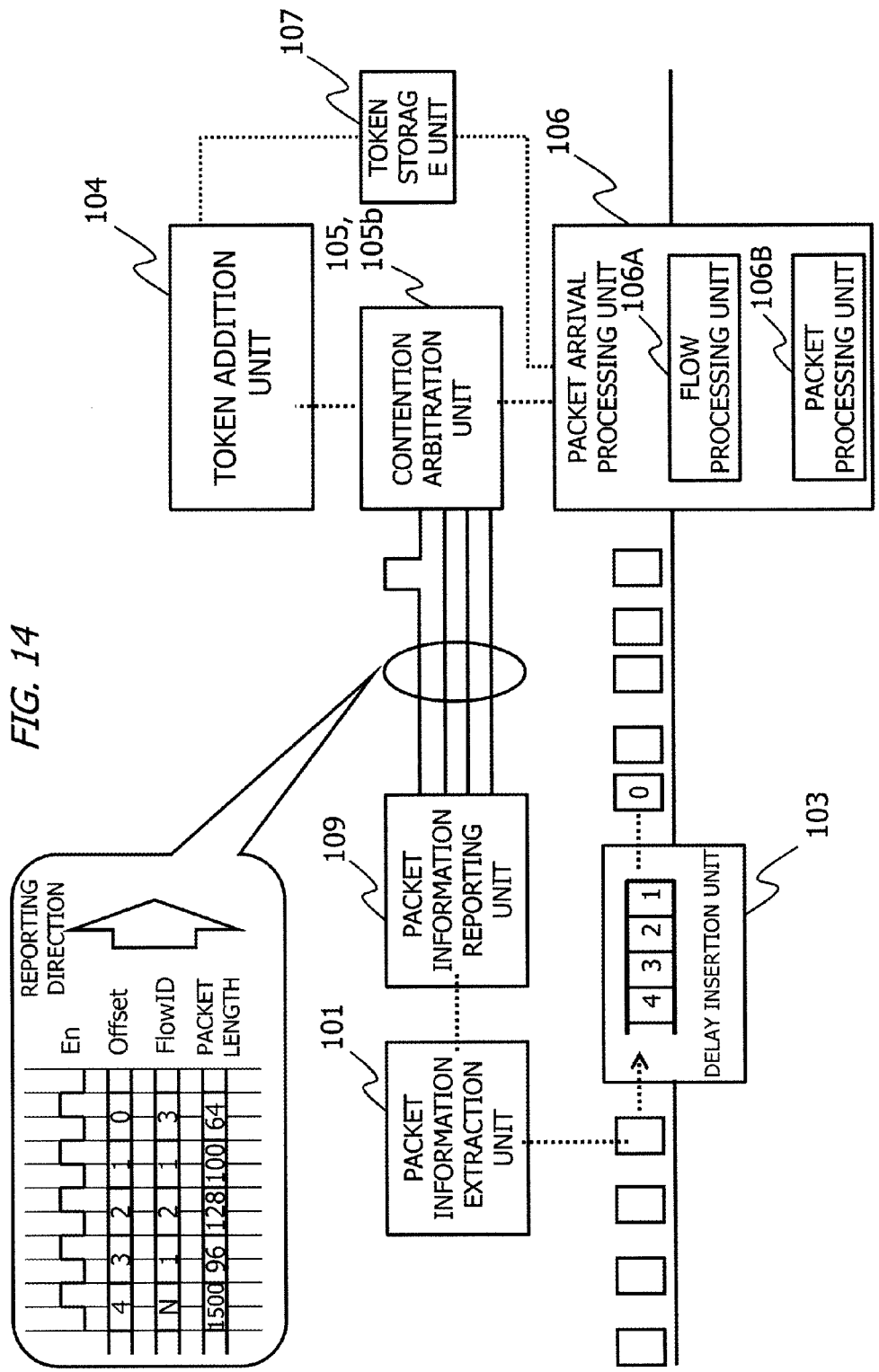
FIG. 14 is a diagram illustrating a variation of packet group information reporting.

FIG. 14 is a diagram illustrating a variation of packet group information reporting. This variation of packet group information reporting is a method for reporting packet group information to the contention arbitration unit 105 using signal lines. In this variation, the packet processing apparatus 100 includes a packet information reporting unit 109 instead of the packet information attaching unit 102.

The packet information reporting unit 109 is connected with the contention arbitration unit 105 via plural signal lines. As packet information on individual packets is accepted as input from the packet information extraction unit 101, the packet information reporting unit 109 puts together the packet information on a predetermined number of successive packets and outputs the resulting information as packet group information to the signal lines. The packet group information is outputted earlier than output of the first packet by providing sufficient time to complete the color determination and token subtraction for the first packet before the first packet of the packet group arrives at the packet arrival processing unit 106. The number of signal lines connecting the packet information reporting unit 109 and contention arbitration unit 105 is, for example, four. One of the signal lines is used for an enable signal (EnQ En in the FIG. 13) configured to control timing of reading of packets. Another of the signal lines is used to report the offset. Another of the signal lines is used to report the flow ID. Another of the signal lines is used to report the packet length. The packet information reporting unit 109 controls output timing so as to synchronize the four signals.

Upon receiving the packet group information via the signal lines, the contention arbitration unit 105 performs the processes described in the first embodiment.

Second Embodiment

According to a second embodiment, the packet processing apparatus 100 reports the packet group information to the token addition unit 104 in advance, thereby avoiding contention between a token addition process of the token addition unit 104 and token subtraction process of the packet arrival processing unit 106. In the second embodiment, description in common with the first embodiment will be omitted.

Figure 15:
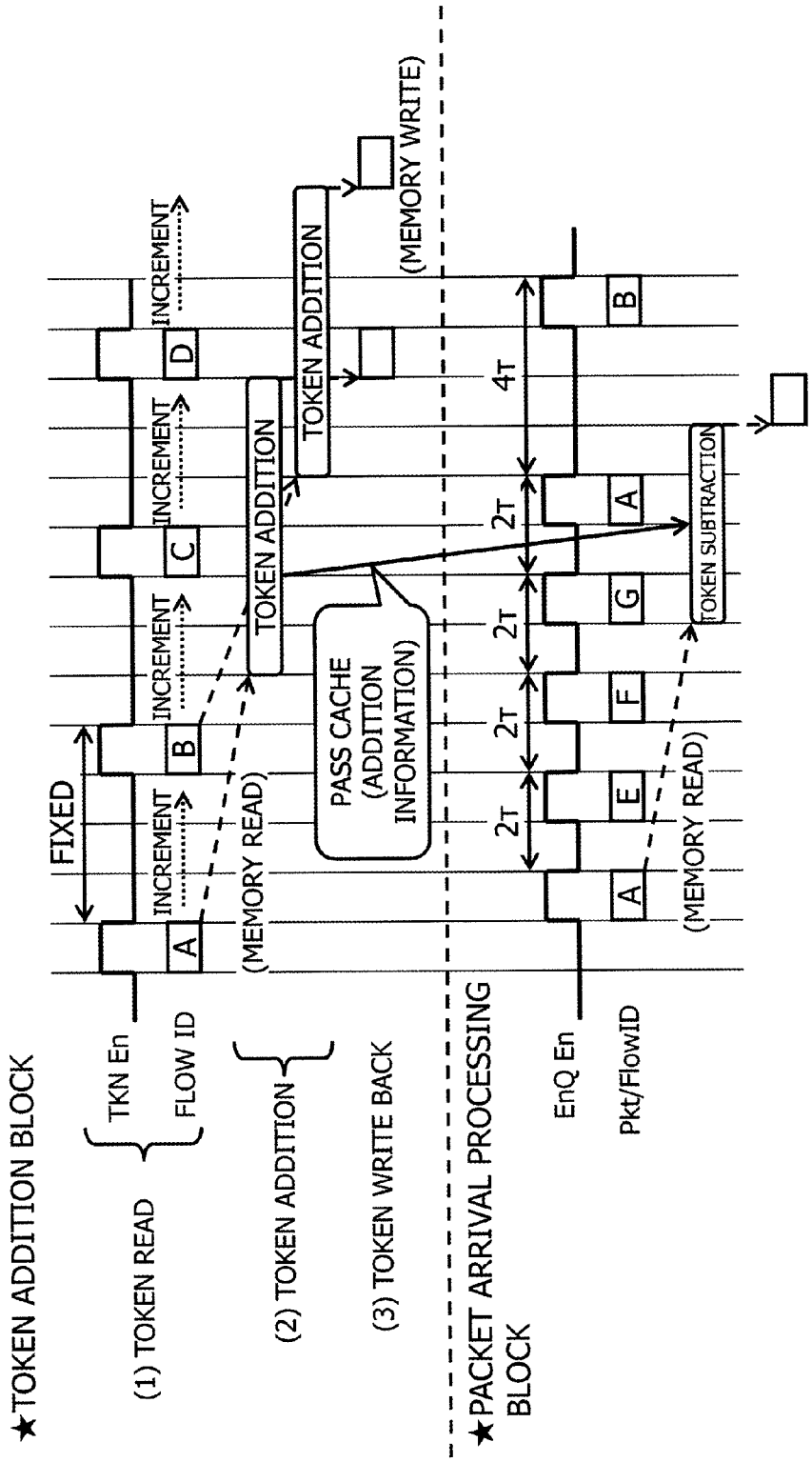
FIG. 15 is a diagram for explaining contention between a token addition process and a token subtraction process that results from packet arrival processing.

FIG. 15 is a diagram for explaining contention between a token addition process and a token subtraction process that results from packet arrival processing. In FIG. 15, procedures of the token addition process are illustrated on the top side while procedures of the packet arrival processing are illustrated on the bottom side.

A flow-by-flow token addition process with respect to a token bucket is performed in a predetermined order on a predetermined cycle. The token addition process is performed, for example, by incrementing the flow ID of the object of token addition by 1. The token addition process is performed through the following procedures: (1) reading of the token amount, (2) token addition, and (3) token amount writeback.

On the other hand, the packet arrival processing is performed through the following procedures as described above: (1) packet arrival, (2) reading of the token amount, (3) token subtraction, and (4) token amount writeback.

According to the second embodiment, concurrent occurrence of a token addition process and token subtraction process with respect to a same token bucket is referred to as contention.

FIG. 15 illustrates contention between a token addition process with respect to flow A and a token subtraction process that results from packet arrival processing related to flow A. In the example illustrated in FIG. 15, since the token addition process with respect to flow A is started first, computational data (cache data) of the block which performs the token addition process is passed to the block which performs the packet arrival processing. The block which performs the packet arrival processing sorts out the cache data to be used. If a token addition process with respect to the token bucket of the same flow occurs during the packet arrival processing, computational data (cache data) of the block which performs the packet arrival processing is passed to the block which performs the token addition process. The block which performs the token addition process sorts out the cache data.

In this way, if there is contention between the token addition process and packet arrival processing for the same token bucket (flow), cache data is exchanged between processing blocks and sorted out. As the cache data is exchanged between the processing blocks and sorted out, the computing time becomes longer. This becomes one of the factors that make it difficult to improve the operating speed of devices.

The policer of the packet processing apparatus according to the second embodiment acquires packet information inputted in advance, predicts contention between the token addition process and token subtraction process in the same flow, and performs a process intended to avoid the contention. The packet processing apparatus according to the second embodiment will be described in detail below.

Figure 16:
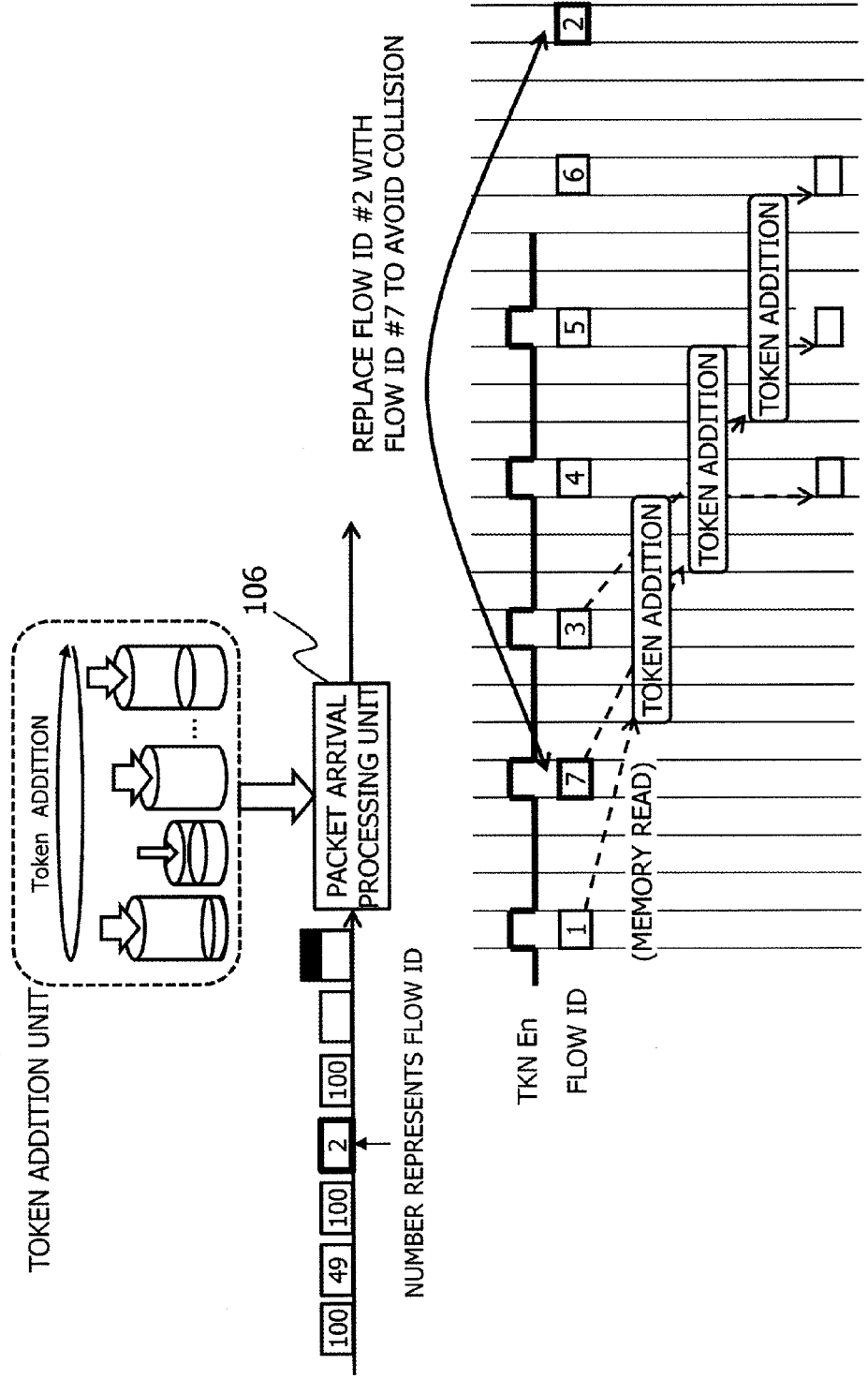
FIG. 16 is a diagram illustrating exemplary processes of a packet processing apparatus according to a second embodiment.

FIG. 16 is a diagram illustrating exemplary processes of a packet processing apparatus according to a second embodiment. A token addition process of a policer on an interface card is illustrated in FIG. 16. Upon acquiring packet group information, a contention arbitration unit 105b (FIG. 7) compares the flow ID of each packet included in the packet group with a token addition process cycle and thereby detects flows likely to cause contention.

A token addition process cycle is indicated in the example of FIG. 16. In the example illustrated in FIG. 16, the token addition process is scheduled to be executed in the order: Flow ID #1, #2, #3, #4, and #5. On the other hand, based on the inputted packet group information, it is detected that the flow IDs of the packets scheduled to arrive are #100, #2, #100, #49, and #100 in this order. In this case, it is expected that, in the flow with a flow ID of #2, there will be contention between a token addition process and token subtraction process that results from packet arrival processing. Thus, according to the second embodiment, the contention arbitration unit 105b avoids contention between the token addition process and token subtraction process by changing the order of execution of token addition processes between the flow with a flow ID of #2 and another flow. In the example illustrated in FIG. 16, the order of execution of the token addition processes is changed between flow #2 and flow #7.

In the second embodiment, the packet processing apparatus 100 has a hardware configuration similar to that of the first embodiment (see FIG. 5 and FIG. 6). In FIG. 7, functional blocks are similar to those of the first embodiment except that the contention arbitration unit 105 is replaced with the contention arbitration unit 105b. Thus, functional blocks that operate differently from the first embodiment will be described.

According to the second embodiment, the contention arbitration unit 105b predicts occurrence of contention between a token addition process of the token addition unit 104 and token subtraction process of the packet arrival processing unit 106 based on the packet group information. If occurrence of contention between a token addition process and token subtraction process is predicted, the contention arbitration unit 105b changes the order of execution of the token addition processes between the flow predicted to cause contention and a flow not predicted to cause contention. The order of execution of the token addition processes is stored in a token addition table described later.

Contention between a token addition process and token subtraction process is predicted, for example, as follows. As an example, it is assumed that a token addition process and packet arrival proceed in the order illustrated in the example of FIG. 16. Also, the following conditions are assumed by way of example.

Packet interval processing: 2 clocks

The number of pipelines: 6 (6 packets are included in packet group)

Computing time per pipeline: 12 clocks

Computing time for token addition process per flow: 4 clocks

Under the above assumption, a maximum computing time for packets included in a single packet group is 12 clocks+2 clocks×(6−1) pipelines=22 clocks. On the other hand, the number of flows for which token addition processes are performed until computations for a single packet group are finished is 6 because 4 clocks×6 flows=24 clocks. Thus, it is likely that there will be contention among the 6 flows.

For example, as illustrated in the example of FIG. 16, if it is assumed as follows, flow IDs of packets scheduled to arrive: #100, #2, #100, #49, #100, and #10 flow IDs subjected to a token addition process during packet arrival processing for a packet group scheduled to arrive: #1, #2, #3, #4, #5, and #6 then the flow with a flow ID of #2 handled in both the processes is likely to cause contention. In this case, the flow with a flow ID of #7, which is not likely to cause contention, can change the order of its token addition process with the flow with a flow ID of #2.

FIG. 17 is a diagram illustrating an example of a token addition table. The token addition table is a table that stores the order of flows on which the token addition unit 104 performs a token addition process. The token addition table is stored, for example, in a memory provided on hardware corresponding to the token addition unit 104. The token addition table contains, for example, a Flow ID, Change Flag, and Changed Flow ID fields. Flow IDs are arranged in ascending order in Flow ID. A flag is set in Change Flag if the given token is subjected to a change in the order of its token addition process in the corresponding flow. The flag, if set in Change Flag, indicates that the order of the token addition process is changed. Changed Flow ID contains the flow ID resulting from the change in the order of the token addition process.

If occurrence of contention between a token addition process and token subtraction process is predicted based on the packet group information, the contention arbitration unit 105b changes the order of execution of the token addition processes and records the results in the token addition table. Specifically, the contention arbitration unit 105b sets the change flag on the flows whose token addition processes are subjected to a change in the order of execution and sets the changed flow IDs in Changed Flow ID.

The token addition unit 104 refers to the token addition table, in order from the top. If a change flag is set on the flow ID referred to, the token addition unit 104 performs the token addition process on the flow indicated by the changed flow ID.

Figure 18:
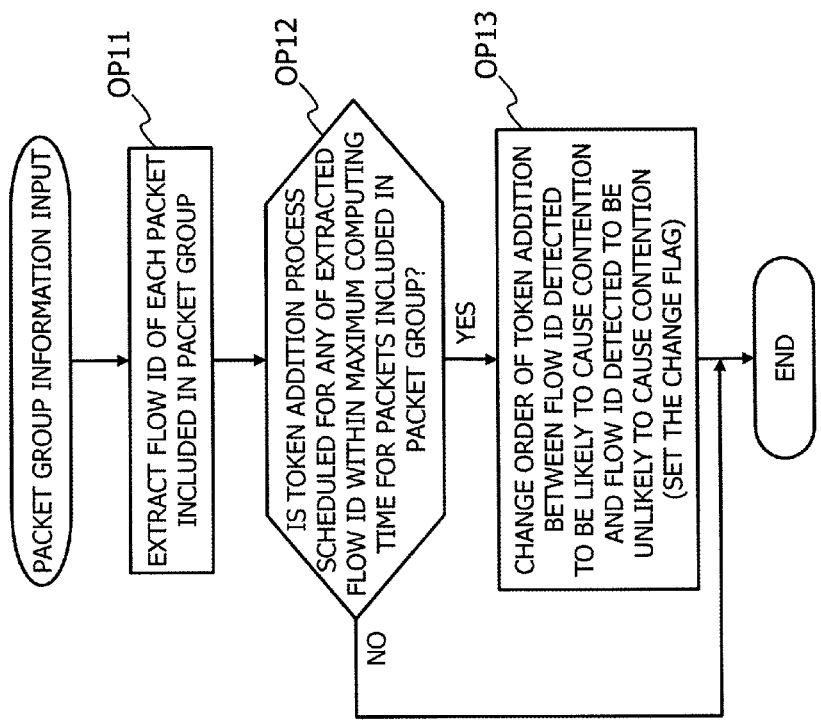
FIG. 18 is an exemplary flowchart of a prediction process performed by a contention arbitration unit regarding occurrence of contention between a token addition process and token subtraction process.

FIG. 18 is an exemplary flowchart of a prediction process performed by the contention arbitration unit 105b regarding occurrence of contention between a token addition process and token subtraction process. The flowchart presented in FIG. 18 is started when the contention arbitration unit 105b acquires packet group information.

In OP11, the contention arbitration unit 105b extracts the flow ID of each packet included in the packet group from the packet group information. Next, the processing goes to OP12.

In OP12, the contention arbitration unit 105b determines whether or not a token addition process is scheduled to be performed for any of the flow IDs extracted from the packet group information within the maximum computing time for the packets included in the packet group. This process is intended to predict occurrence of contention between the token addition process and a token subtraction process. If a token addition process is scheduled to be performed for any of the flow IDs extracted from the packet group information within the maximum computing time for the packets included in the packet group (OP12: Yes), occurrence of contention is predicted. In that case, the processing goes to OP13. Occurrence of contention is predicted with respect to the flow which has a flow ID identical to any of the flow IDs extracted from the packet group information and for which a token addition process is scheduled to be performed within the maximum computing time for the packets included in the packet group.

If a token addition process is not scheduled to be performed for any of the flow IDs extracted from the packet group information within the maximum computing time for the packets included in the packet group (OP12: No), occurrence of contention between the token addition process and a token subtraction process is not predicted. In that case, the order of execution of token addition processes is not changed, and the processes illustrated in FIG. 18 are finished.

In OP13, the contention arbitration unit 105b changes the order of execution of token addition processes between the flow ID detected to be likely to cause contention and the flow ID detected to be unlikely to cause contention. Specifically, on the token addition table, the contention arbitration unit 105b sets the change flag on the flow ID detected to be likely to cause contention and rewrites its changed flow ID with the flow ID detected to be unlikely to cause contention. Also, on the token addition table, the contention arbitration unit 105b sets the change flag on the above-described flow ID detected to be unlikely to cause contention and rewrites its changed flow ID with the above-described flow ID detected to be likely to cause contention. Then, the processes illustrated in FIG. 18 are finished.

FIG. 19A is an exemplary flowchart of a token addition process performed by the token addition unit 104. The flowchart presented in FIG. 19A is executed on a predetermined cycle.

In OP21, the token addition unit 104 increments a reference flow ID. The reference flow ID is a flow ID that indicates entries of the token addition table to be referred to. Also, the token addition unit 104 sets the reference flow ID to the flow ID of the object of token addition. Next, the processing goes to OP22. An initial value of the reference flow ID is, for example, 0.

In OP22, in the token addition table, the token addition unit 104 determines whether or not the change flag is set as an entry for the reference flow ID. If the change flag is not set as an entry for the reference flow ID (OP22: No), the processing goes to OP25. In OP25, the token addition unit 104 adds token to the token bucket for the reference flow ID, which is the flow ID of the object of token addition. Then, the processes illustrated in FIG. 19A are finished.

If the change flag is set as an entry for the reference flow ID (OP22: Yes), the processing goes to OP23. In OP23, the token addition unit 104 resets the change flag set as an entry for the reference flow ID. Consequently, when a token addition process is performed on the flow with the current reference flow ID the next time, the flow with the current reference flow ID is subjected to token addition as it is without changing the order. Next, the processing goes to OP24.

In OP24, the token addition unit 104 changes the flow ID of the object of token addition from the reference flow ID to the changed flow ID. Subsequently, in OP25, the token addition unit 104 adds token to the token bucket for the changed flow ID, which is the flow ID of the object of token addition. Consequently, the order of execution of the token addition processes is changed. Then, the processes illustrated in FIG. 19A are finished. Incidentally, when a maximum value of the flow ID is reached, the reference flow ID is reset to 0 as a result of the increment in OP21.

Figure 19B:
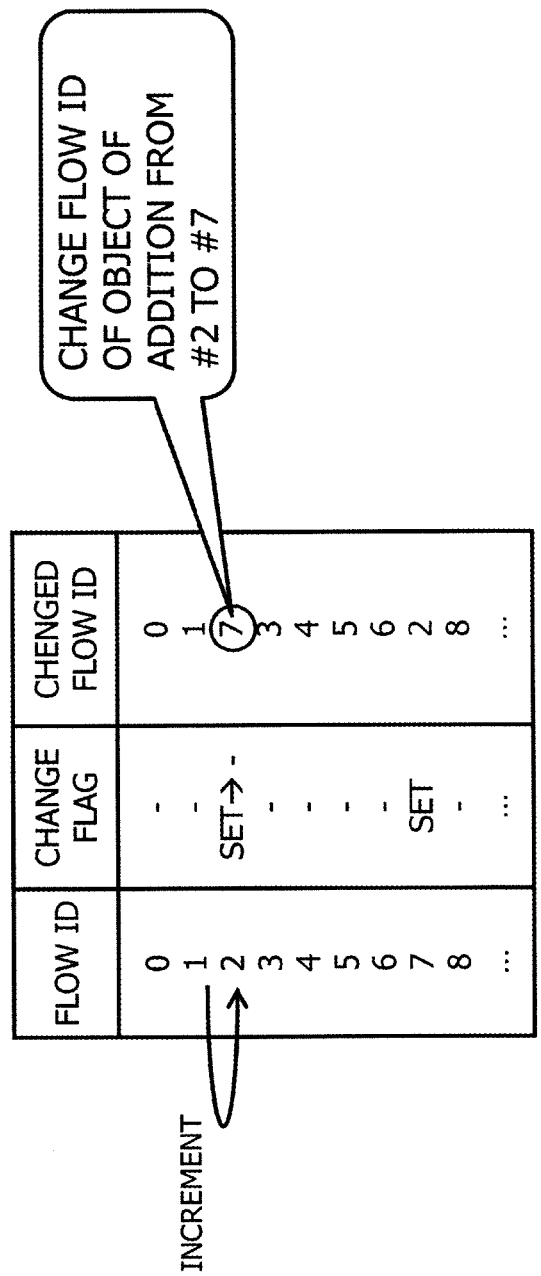
FIG. 19B is a diagram illustrating an example of the token addition table during execution of a token addition process.

FIG. 19B is a diagram illustrating an example of the token addition table during execution of a token addition process. In the token addition table illustrated in FIG. 19B, the order of execution of the token addition processes is changed between flow #2 and flow #7. That is, a change flag is set as an entry for flow #2, and the corresponding entry in Changed Flow ID is #7. Also, a change flag is set as an entry for flow #7, and the corresponding entry in Changed Flow ID is #2. Entries for flow #2 in the token addition table illustrated in FIG. 19B will be described, assuming that token addition processes are performed.

When a token addition process cycle comes, the token addition unit 104 increments and thereby changes the reference flow ID from #1 to #2 (OP21). At this point, the flow ID of the object of token addition is the reference flow ID, which is #2. Since a change flag is set as an entry for the flow ID of #2 in the token addition table (OP22: Yes), the token addition unit 104 resets the change flag set as an entry for the flow ID of #2 in the token addition table (OP23). Consequently, when flow #2 becomes a reference flow next time, out of entries for the flow ID of #2, flow #2 indicated by the Flow ID field becomes an object of token addition instead of the flow indicated by the Changed Flow ID field.

Since the Changed Flow ID field is set to #7 as an entry for the flow ID of #2 in the token addition table, the token addition unit 104 changes the flow ID of the object of token addition from #2 to #7, i.e., from the reference flow ID to the changed flow ID (OP24). Next, the token addition unit 104 adds token to the token bucket of flow #7 (OP25).

Subsequently, when a token addition process cycle comes, the reference flow ID is incremented to #3 (OP21), and the processes OP21 to OP25 are performed.

<Operation and Effects of Second Embodiment>

According to the second embodiment, before a packet group is inputted to the packet arrival processing unit 106, packet group information about the packet group is reported to the contention arbitration unit 105b. The contention arbitration unit 105b predicts occurrence of contention between a token addition process of the token addition unit 104 and token subtraction process of the packet arrival processing unit 106 based on the reported packet group information. If occurrence of such contention is predicted, the contention arbitration unit 105b changes the order of execution of the token addition processes between the flow predicted to cause the contention and another flow not predicted to cause the contention. Consequently, according to the second embodiment, the packet processing apparatus 100 can avoid occurrence of contention between a token addition process of the token addition unit 104 and token subtraction process of the packet arrival processing unit 106.

Since occurrence of contention such as described above can be avoided, there is no need to exchange cache data between the token addition unit 104 and packet arrival processing unit 106 or sort out the cache data. This makes it possible to reduce circuit scales. Also, devices can be operated at a higher clock rate. Note that the techniques described in the second embodiment are applicable not only to policers, but also, for example, to schedulers and shapers that use token buckets. Besides, the variations of packet group information reporting according to the first embodiment are also applicable to the second embodiment.

Third Embodiment

In a third embodiment, description in common with the first embodiment and second embodiment will be omitted.

Figure 20:
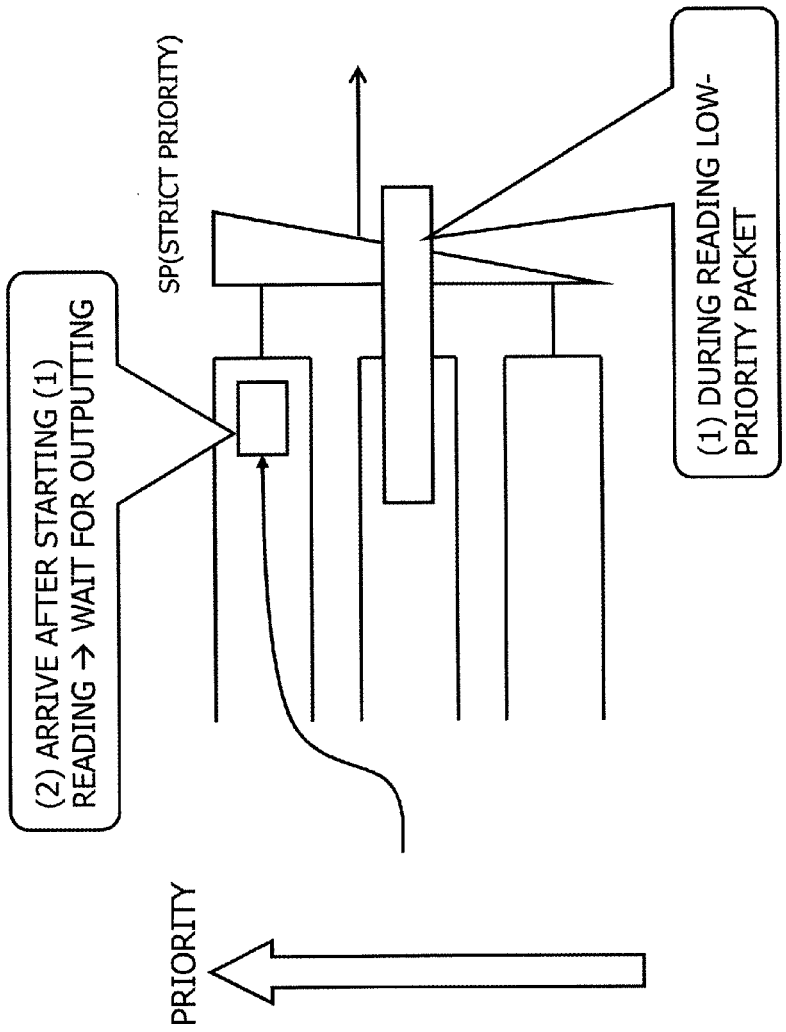
FIG. 20 is a diagram illustrating an exemplary operation of a scheduler.

FIG. 20 is a diagram illustrating an exemplary operation of a scheduler. The scheduler is provided with plural queues, each of which is assigned a priority. A priority class is set on each packet arriving at the scheduler, for example, by an IF card on the input side of the packet processing apparatus or by another apparatus, and each packet is stored in a queue corresponding to the class. The scheduler outputs packets, for example, beginning with a packet stored in a high-priority queue. Examples of packets assigned a high priority include a voice packet.

If, for example, during output of (1) a large-sized and low-priority packet, (2) a high-priority packet arrives at a queue, the high-priority packet is not outputted until the output of the low-priority packet is finished regardless of the priority. This could further delay the high-priority packet. However, the high-priority packet may carry data, such as a voice packet, sensitive to delays and will be impacted significantly if forced to wait until the large and low-priority packet is outputted.

In the third embodiment, the scheduler or shaper of the packet processing apparatus acquires packet group information in advance and performs a process intended for a high-priority packet to avoid waiting until a low-priority packet is outputted, based on the packet group information. That is, in the third embodiment, the packet processing apparatus acquires packet group information in advance and performs a process intended to avoid contention between reading of a high-priority packet and reading of a low-priority packet, based on the packet group information.

Figure 21:
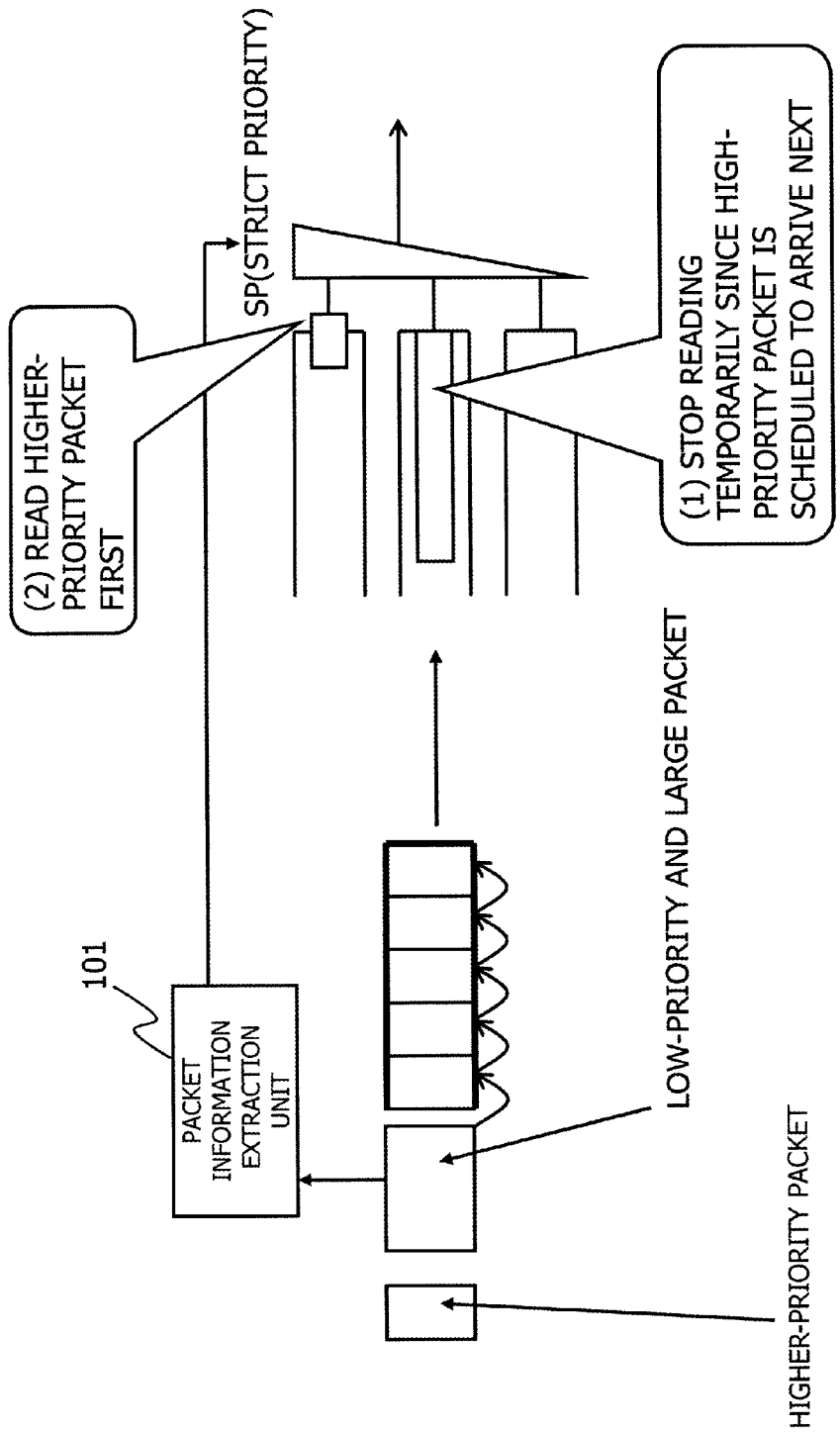
FIG. 21 is a diagram for explaining an exemplary operation of a packet processing apparatus according to a third embodiment.

FIG. 21 is a diagram for explaining an exemplary operation of the packet processing apparatus according to the third embodiment. In the third embodiment, the packet processing apparatus detects existence of a large and low-priority packet ahead of a high-priority packet based on the packet group information. During a packet read, the packet processing apparatus (1) temporarily stops reading the detected large and low-priority packet, and (2) first reads a high-priority packet arriving later at a high-priority queue. This makes it possible to prevent a delay caused if the high-priority packet is forced to wait until the low-priority packet is outputted.

In the third embodiment, the packet processing apparatus has a hardware configuration similar to that of the first embodiment, and thus description thereof will be omitted.

Figure 22:
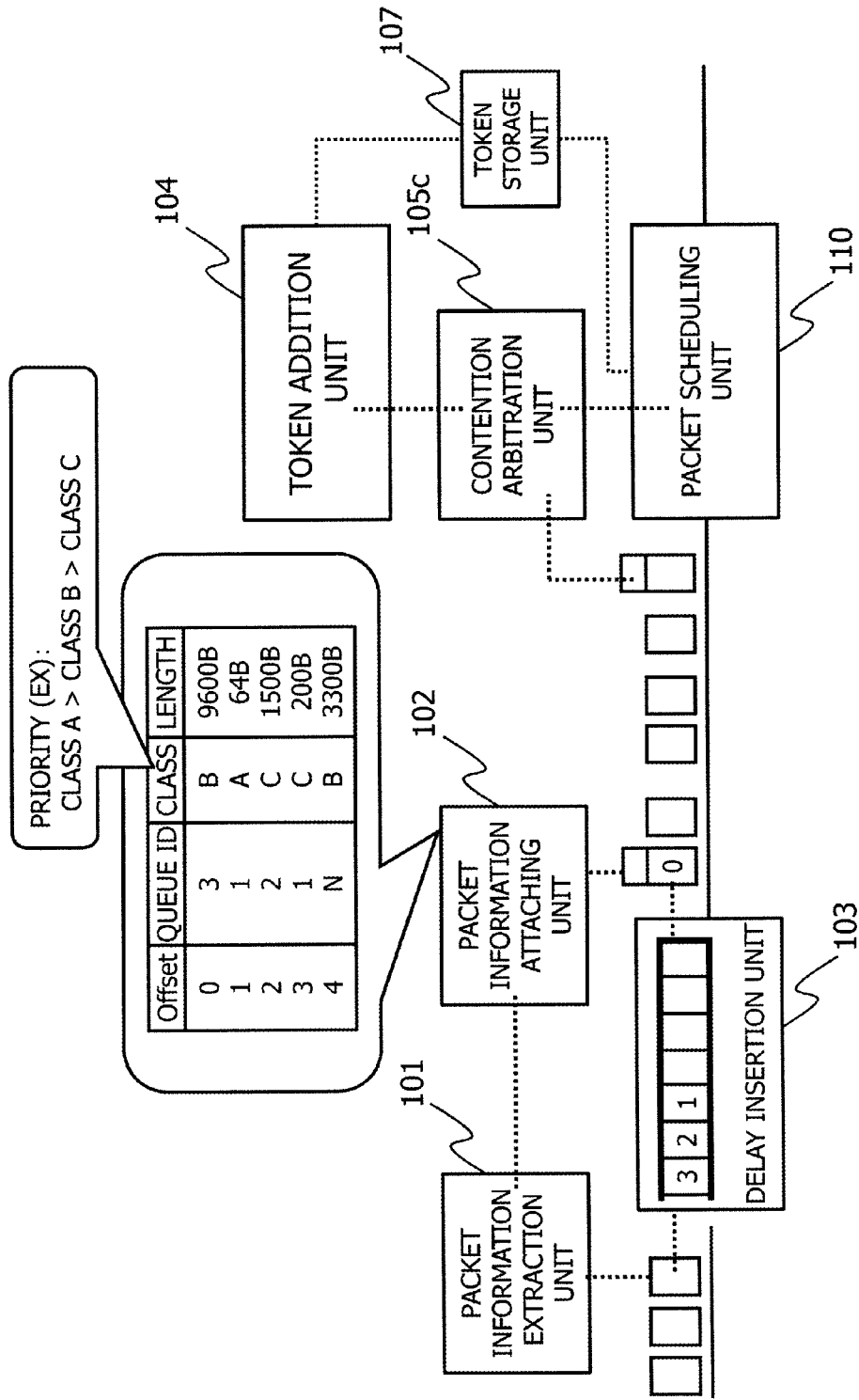
FIG. 22 is an exemplary functional block diagram of a QoS circuit.

FIG. 22 is an exemplary functional block diagram of the QoS circuit 16. FIG. 22 illustrates that block of the QoS circuit 16 which serves the function of the scheduler on the output side. The QoS circuit 16 includes the packet information extraction unit 101, the packet information attaching unit 102, the delay insertion unit 103, the token addition unit 104, a contention arbitration unit 105c, and a packet scheduling unit 110. These components are implemented by electric or electronic circuits, FPGAs, ASICs, or the like. These functional blocks are exemplary, and plural functional blocks may be combined into a single functional block as appropriate. Also, these functional blocks may be configured as a single circuit containing all of them. Also, plural blocks may be produced by combining two or more functional blocks into a single block and configuring each of the blocks with a single FPGA or ASIC. For example, the packet information extraction unit 101, packet information attaching unit 102, and delay insertion unit 103 may be configured as a single FPGA or ASIC, and the token addition unit 104, contention arbitration unit 105c, and packet scheduling unit 110 may be configured as another FPGA or ASIC. The packet information attaching unit 102, delay insertion unit 103, and token addition unit 104 are similar to that of the first embodiment, and thus description thereof will be omitted.

The packet information extraction unit 101 extracts packet information from each inputted packet. According to the third embodiment, the packet information extraction unit 101 extracts, for example, a queue ID, packet length, and class information as packet information. The queue ID is identification information about the queue in which the packet is stored. The queue ID is stored, for example, in the internal header. The class information is attached, for example, by an input-side IF of the same packet processing apparatus and configured to indicate a priority class. The class information is stored, for example, in a Type of Service field in the packet header, the internal header, or the like.

After being extracted by the packet information extraction unit 101, the packet information about each packet is outputted to the packet information attaching unit 102. The packet information attaching unit 102 puts together the packet information about a predetermined number of successive packets into packet group information and attaches the packet group information to the internal header of a predetermined packet located ahead of the predetermined number of successive packets to report the packet group information to the contention arbitration unit 105c.

The packet scheduling unit 110 is a functional block functioning as a scheduler. The packet scheduling unit 110 is provided with plural queues, each of which is assigned a priority class. Based on the class information attached to arriving packets, the packet scheduling unit 110 stores the arriving packets in appropriate queues and outputs packets preferentially from a queue of a high-priority class.

Upon acquiring packet group information, the contention arbitration unit 105c detects arrival of a high-priority packet during reading of a large and low-priority packet. That is, the contention arbitration unit 105c predicts occurrence of contention between a read process for a high-priority packet and a read process for a low-priority packet. If occurrence of such contention is predicted, the contention arbitration unit 105c instructs the packet scheduling unit 110 to temporarily stop reading the low-priority packet and preferentially read the high-priority packet. Details will be described with reference to FIG. 23 below.

Figure 23:
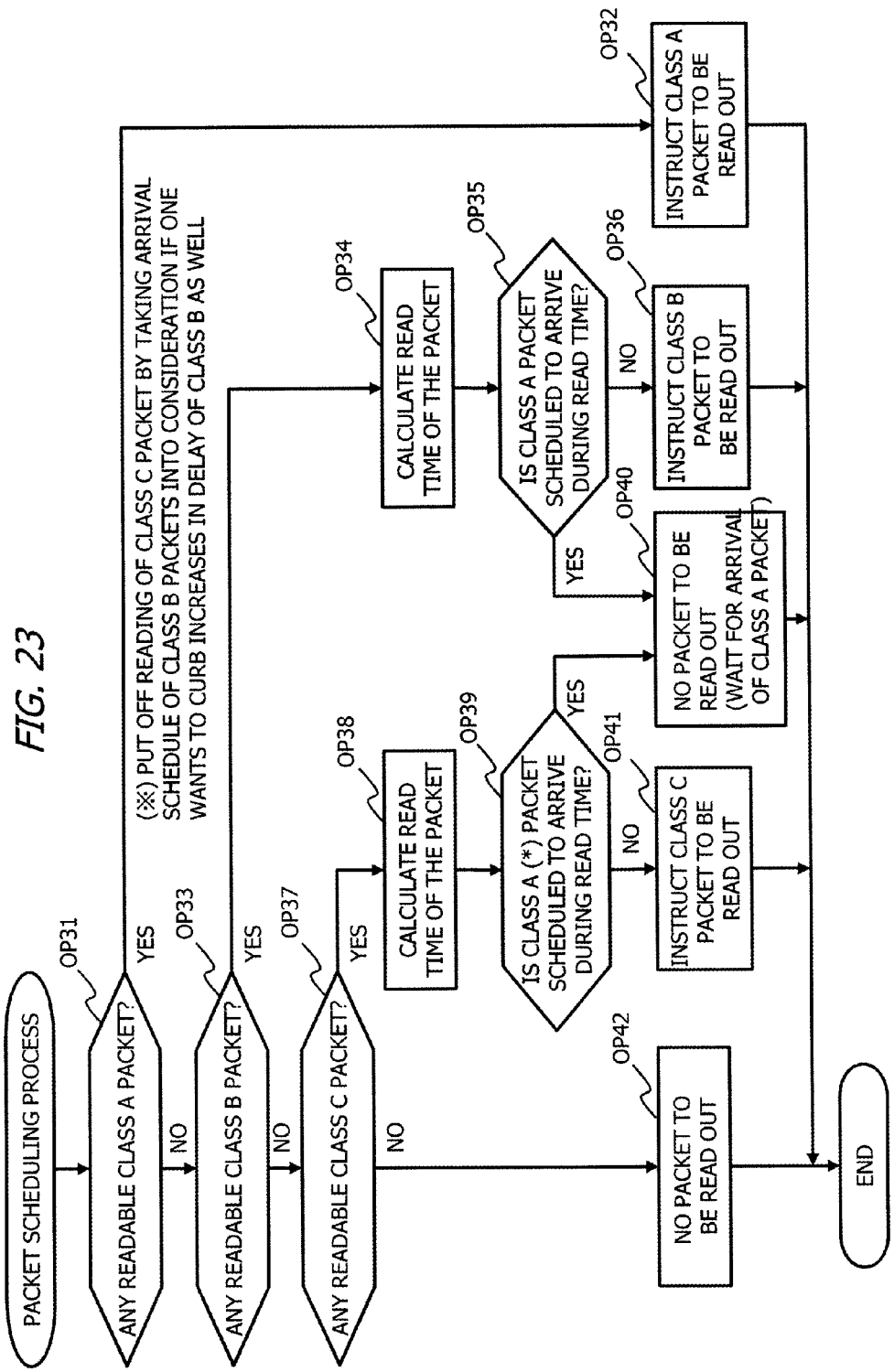
FIG. 23 is an exemplary flowchart of a scheduling process of a packet scheduler unit.

FIG. 23 is an exemplary flowchart of a scheduling process of the contention arbitration unit 105c. The flowchart presented in FIG. 23 is executed, for example, repeatedly or on a predetermined cycle. Also, the flowchart in FIG. 23 describes a packet scheduling process performed when the packet scheduling unit 110 is provided with queues of three classes: class A, class B, and class C. It is assumed that priorities are as follows: class A>class B>class C.

In OP31, the contention arbitration unit 105c determines whether or not any readable packet is stored in the highest-priority, class A queue. If a readable packet is stored in the class A queue (OP31: Yes), the processing goes to OP32. In OP32, the contention arbitration unit 105c instructs the packet scheduling unit 110 to read the first packet stored in the class A queue. This finishes the processes illustrated in FIG. 23, and the processes are repeated, beginning with OP31.

If no readable packet is stored in the class A queue (OP31: No), the processing goes to OP33. In OP33, the contention arbitration unit 105c determines whether or not any readable packet is stored in class B, the highest-priority class next to class A.

If a readable packet is stored in the class B queue (OP33: Yes), the processing goes to OP34. In OP34, the contention arbitration unit 105c calculates the time (hereinafter, read time) needed to read the first packet stored in the class B queue. Next, the processing goes to OP35.

In OP35, the contention arbitration unit 105c determines whether or not a class A packet is scheduled to arrive during the read time of the first packet in the class B queue. An arrival schedule of class A packets is acquired from packet group information. If a class A packet is scheduled to arrive during the read time of the first packet in the class B queue (OP35: Yes), the class A packet scheduled to arrive is expected to encounter an increased read delay due to the reading of the first packet in the class B queue. Therefore, the processing goes to OP40, in which the contention arbitration unit 105c instructs the packet scheduling unit 110 to temporarily stop reading packets out of the class B queue by determining that there is no packet to read out even though packets are stored in the class B queue. This state is, after all, a state of wait for arrival of a class A packet. This finishes the processes illustrated in FIG. 23, and the processes are repeated, beginning with OP31. Subsequently, when a class A packet arrives and is stored in the class A queue, the class A packet is read out (OP31, OP32). Consequently, the class A packet can be read out without an increased delay caused by reading of a low-priority packet.

If no class A packet is scheduled to arrive during the reading of the first packet in the class B queue (OP35: No), the processing goes to OP36. In OP36, the contention arbitration unit 105c instructs the packet scheduling unit 110 to read the first packet in the class B queue. This finishes the processes illustrated in FIG. 23, and the processes are repeated, beginning with OP31.

If it turns out in OP33 that no readable packet is stored in the class B queue (OP33: No), it is indicated that no packet is stored in either the class A queue or class B queue. Next, the processing goes to OP37, in which the contention arbitration unit 105c determines whether or not any readable packet is stored in class C, the next-highest-priority class after class B.

If readable packet is stored in class C (OP37: Yes), the processing goes to OP38. In OP38, the contention arbitration unit 105c calculates the time (hereinafter, read time) needed to read the first packet stored in the class C queue. Next, the processing goes to OP39.

In OP39, the contention arbitration unit 105c determines whether or not a class A packet is scheduled to arrive during the read time of the first packet in the class C queue. If a class A packet is scheduled to arrive during the read time of the first packet in the class C queue (OP39: Yes), the class A packet scheduled to arrive is expected to encounter an increased read delay due to the reading of the first packet in the class C queue. Therefore, the processing goes to OP40, in which the contention arbitration unit 105c instructs the packet scheduling unit 110 to temporarily stop reading packets out of the class C queue by determining that there is no packet to read out even though packets are stored in the class C queue. This state is a state of wait for arrival of a class A packet. This finishes the processes illustrated in FIG. 23, and the processes are repeated, beginning with OP31.

If no class A packet is scheduled to arrive during the reading of the first packet in the class C queue (OP39: No), the processing goes to OP41. In OP41, since no packet is stored in either the class A queue or class B queue and no packet is scheduled to arrive at the class A queue either, the contention arbitration unit 105c instructs the packet scheduling unit 110 to read the first packet in the class C queue. This finishes the processes illustrated in FIG. 23, and the processes are repeated, beginning with OP31.

If it turns out in OP37 that no readable packet is stored in the class C queue (OP37: No), it is indicated that no packet is stored in any of the class A, class B, or, class C queues. Next, the processing goes to OP42, in which the contention arbitration unit 105c determines that there is no packet to read out. This finishes the processes illustrated in FIG. 23, and the processes are repeated, beginning with OP31.

Besides, if it is determined in OP39 whether or not a class B packet is scheduled to arrive and if the processing goes to OP40 when it turns out that a class B packet is scheduled to arrive, any increased delay in reading the class B packet caused by reading of a class C packet can be reduced.

<Operation and Effects of Third Embodiment>

According to the third embodiment, since information about the packets inputted to the packet scheduling unit 110 is acquired before the packets are inputted to the packet scheduling unit 110, the packet processing apparatus can curb increases in the delay in high-priority packets caused by low-priority packets. Besides, the variations of packet group information reporting according to the first embodiment are also applicable to the third embodiment.

<Others>

Some or all of the first to third embodiments described above may be implemented in combination as appropriate.

The disclosed packet processing apparatus and packet processing method can improve processing speed for packet processing including bandwidth control.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more the embodiments of the present invention have been described in detail, it should be understood that the various changes, substitutions, and alterations could be made hereto without departing from the spirit and scope of the invention.

What is claimed is:

1. A packet processing apparatus comprising:
a storage unit that stores an amount of packet transmission rights;
an addition unit that, in a predetermined cycle, reads the amount of transmission rights out of the storage unit, updates the amount of transmission rights by adding a predetermined amount, and writes the amount of transmission rights back into the storage unit;
a packet processing unit that performs a packet output process and reads, regarding each of inputted packets, the amount of transmission rights out of the storage unit, updates the amount of transmission rights by subtracting an amount commensurate with a packet length of a packet to be outputted, and writes the amount of transmission rights back into the storage unit;
an extraction unit that extracts information about each of packets before the packets are inputted to the packet processing unit; and
a contention handling unit that performs a process preventing a plurality of series of processes from occurring based on information about a predetermined number of successive packets extracted by the extraction unit, the series of processes including reading and writing of the amount of transmission rights from/into the storage unit by at least one of the addition unit and the packet processing unit before is some or all of the predetermined number of successive packets are inputted in the packet processing unit.

2. The packet processing apparatus according to claim 1, wherein:
the storage unit stores amounts of transmission rights on a flow by flow basis;
the contention handling unit detects packets belonging to a same flow from the information about the predetermined number of packets and reports the information about the packets to the packet processing unit on a flow by flow basis, before some or all of the predetermined number of packets are inputted in the packet processing unit, as the process preventing the plurality of series of processes from occurring performed by the packet processing unit; and
the packet processing unit reads transmission rights out of the storage unit for each of flows among the predetermined number of packets, subtracts a total packet length of an appropriate flow among the predetermined number of packets from the amount of transmission rights of the read appropriate flow, and writes back the transmission rights of the appropriate flow, and when each of the predetermined number of packets is inputted, the packet processing unit outputs the each of the predetermined number of packets based on a processing result produced by the contention handling unit.

3. The packet processing apparatus according to claim 2, wherein before some or all of the predetermined number of packets are inputted in the packet processing unit, the packet processing unit determines a discard priority of each of the predetermined number of packets based on the information about the predetermined number of packets, and when the each of the predetermined number of packets are inputted, the packet processing unit attaches a determination result of packet discard priority to the each of the predetermined number of packets.

4. The packet processing apparatus according to claim 1, wherein:
the storage unit stores amounts of transmission rights on a flow by flow basis; and
the contention handling unit performs, before some or all of the predetermined number of successive packets are inputted to the packet processing unit, if contention for a transmission rights of a same flow is predicted to occur between the series of processes of the addition unit and the packet processing unit based on the information about the predetermined number of successive packets extracted by the extraction unit, the process avoiding the contention involves changing an order of execution of processes performed by the addition unit between the flow predicted to cause the contention and another flow not predicted to cause the contention.

5. The packet processing apparatus according to claim 1, wherein the extraction unit puts together the extracted information on the predetermined number of successive packets and reports resulting information by attaching the resulting information to a packet located ahead of the first packet of the predetermined number of successive packets.

6. The packet processing apparatus according to claim 1, wherein the extraction unit puts together the extracted information on the predetermined number of successive packets and reports resulting information by inserting the resulting information as a control packet into a predetermined location ahead of the first packet of the predetermined number of packets.

7. The packet processing apparatus according to claim 1, wherein the extraction unit reports the extracted information about the packets via a signal line connected to the contention handling unit.

8. A packet processing method executed by a packet processing apparatus provided with a packet processing unit that performs a packet output process; a storage unit that stores an amount of packet transmission rights; and an addition unit that, in a predetermined cycle, reads the amount of transmission rights out of the storage unit, updates the amount of transmission rights by adding a predetermined amount, and writes the amount of transmission rights back into the storage unit, comprising:

reading, regarding each of inputted packets, the amount of transmission rights out of the storage unit, updating the amount of transmission rights by subtracting an amount commensurate with a packet length of a packet to be outputted, and writing the amount of transmission rights back into the storage unit, extracting information about each of packets before the packets are inputted to the packet processing unit; and performing a process preventing a plurality of series of processes from occurring based on extracted information about a predetermined number of successive packets, the series of processes including reading and writing of the amount of transmission rights from/into the storage unit by at least one of the addition unit and the packet processing unit before some or all of the predetermined number of successive packets are inputted in the packet processing unit.

\* \* \* \* \*

UNITED STATES PATENT AND TRADEMARK OFFICE
CERTIFICATE OF CORRECTION

| | | |
|---|---|---|
| PATENT NO. | : 9,148,378 B2 | |
| APPLICATION NO. | : 13/887985 | |
| DATED | : September 29, 2015 | |
| INVENTOR(S) | : Atsushi Kitada | |

It is certified that error appears in the above-identified patent and that said Letters Patent is hereby corrected as shown below:

Claims

Claim 1 (Column 24, Line 15-16): The word "is" should be deleted and the claim should read as follows:

--...by at least one of the addition unit and the packet processing unit before some or all of the predetermined...--

Signed and Sealed this
Fifth Day of April, 2016

Michelle K. Lee
*Director of the United States Patent and Trademark Office*